United States Patent
Nishiyama

(10) Patent No.: US 9,746,556 B2
(45) Date of Patent: Aug. 29, 2017

(54) SIGNAL PROCESSING DEVICE AND RADAR APPARATUS

(71) Applicant: Furuno Electric Co., Ltd., Nishinomiya (JP)

(72) Inventor: Koji Nishiyama, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 455 days.

(21) Appl. No.: 14/522,517

(22) Filed: Oct. 23, 2014

(65) Prior Publication Data
US 2015/0116143 A1 Apr. 30, 2015

(30) Foreign Application Priority Data

Oct. 24, 2013 (JP) .................................. 2013-221081

(51) Int. Cl.
*G01S 13/93* (2006.01)
*G01S 7/41* (2006.01)
*G01S 13/538* (2006.01)

(52) U.S. Cl.
CPC ............ *G01S 13/9307* (2013.01); *G01S 7/41* (2013.01); *G01S 13/538* (2013.01)

(58) Field of Classification Search
CPC .... G01S 13/9307; G01S 13/538; G01S 13/93; G01S 13/931; G01S 2013/9314–2013/9396; G01S 7/41; G01S 7/415; G01S 7/418
See application file for complete search history.

(56) References Cited

U.S. PATENT DOCUMENTS

| | | | | |
|---|---|---|---|---|
| 4,281,326 A | * | 7/1981 | Anderson | G08G 3/02 342/177 |
| 8,135,614 B2 | * | 3/2012 | Allen | G07B 15/063 705/13 |
| 9,207,320 B2 | * | 12/2015 | Kim | G01S 13/93 |
| 2003/0122702 A1 | * | 7/2003 | Kishida | G01S 13/345 342/70 |
| 2003/0142007 A1 | * | 7/2003 | Ono | G01S 13/345 342/70 |
| 2005/0024258 A1 | * | 2/2005 | Matsuoka | G01S 13/584 342/70 |

FOREIGN PATENT DOCUMENTS

JP 2007083976 A 4/2007

* cited by examiner

*Primary Examiner* — Matthew M Barker
(74) *Attorney, Agent, or Firm* — Alleman Hall Creasman & Tuttle LLP

(57) ABSTRACT

A signal processing device is provided. The signal processing device processes reception signals received by an object detector that detects existence of objects. The signal processing device includes a coordinate detecting module configured to detect a plurality of sets of representative coordinates of each of two echo images at two or more timings, the two echo images obtained from the reception signals and caused by two target objects. The signal processing device also includes a determining module configured to determine, based on the plurality of sets of representative coordinates at the two or more timings, whether the two echo images are obtained from towing object signals caused by a pair of a towing object and a towed object.

8 Claims, 14 Drawing Sheets

SIGNAL PROCESSING DEVICE AND RADAR APPARATUS

CROSS-REFERENCE TO RELATED APPLICATION(S)

This application claims priority under 35 U.S.C. §119 to Japanese Patent Application No. 2013-221081, which was filed on Oct. 24, 2013, the entire disclosure of which is hereby incorporated by reference.

TECHNICAL FIELD

This disclosure generally relates to a signal processing device, which processes a reception signal received by an object detector, and to a radar apparatus, which includes the signal processing device.

BACKGROUND OF THE INVENTION

Conventionally, signal processing devices for processing reception signals received by radar apparatuses (object detectors) which detect existence of objects on the sea, have been known. Generally, a signal processing device of a radar apparatus receives reflection waves caused by electromagnetic waves transmitted from the radar apparatus and suitably processes them to detect positions of objects on the sea (e.g., ships traveling on the sea).

Meanwhile, the ships traveling on the sea include a towing ship and a towed ship connected with each other by a towing line, such as a rope. The towed ship can travel on the sea by the towing ship pulling it via the towing line. For example, JP2007-083976A discloses a sea transportation monitoring system for monitoring a fixed state of cargo installed on a transportation barge (towed ship) towed by a tugboat (towing ship).

Regarding traveling of ships, if a ship intends to pass between a towing ship and a towed ship without noticing that they are in the relation between the towing ship and the towed ship as described above, the ship may be caught by the towing line. Although it can be considered to detect the towing line itself by a radar apparatus for prevention, since a towing line is much thinner than a ship, the detection thereof is extremely difficult.

SUMMARY OF THE INVENTION

The purpose of this disclosure relates to discriminating a towing object and a towed object from other objects on water.

According to one aspect of this disclosure, a signal processing device is provided, which processes reception signals received by an object detector that detects existence of objects. The signal processing device includes a coordinate detecting module configured to detect a plurality of sets of representative coordinates of each of two echo images at two or more timings, the two echo images obtained from the reception signals and caused by two target objects. The signal processing device also includes a determining module configured to determine, based on the plurality of sets of representative coordinates at the two or more timings, whether the two echo images are obtained from towing object signals caused by a pair of a towing object and a towed object.

Here, the towing object and the towed object are defined as follows. Specifically, in a case where one of objects tows the other object, the object is defined as the towing object and the other object is defined as the towed object. Moreover, in a case where an object at the front in a traveling direction thereof tows two or more objects connected thereto in line, the towing object and the towed object are defined based on the relation between two continuous objects of the plurality of objects, and the object at the front in the traveling direction is defined as the towing object and the object at the rear is defined as the towed object.

The signal processing device is preferred to further include a calculating module configured to calculate a moving distance and a moving direction of each of the echo images per predetermined period of time, based on the plurality of sets of representative coordinates at the two or more timings. The determining module is preferred to determine that the two echo images are obtained from the towing object signals when a first condition and at least one of second and third conditions are satisfied. The first condition may be that a difference between the moving distance of one of the two echo images and the moving distance of the other echo image is smaller than a predetermined length. The second condition may be that an angle between an echo image segment connecting the two echo images and the moving direction of one of the two echo images is smaller than a predetermined angle and an angle between the moving directions of the two echo images is smaller than a predetermined angle, at one of the two or more timings. The third condition may be that each of an angle between the moving direction of one of the two echo images and the echo image segment is smaller than a predetermined angle and an angle between the moving direction of the other echo image and the echo image segment is smaller than a predetermined angle, at the one of the two or more timings.

Further, the determining module is preferred to determine that the two echo images are obtained from the towing object signals under a condition that the echo image segment is shorter than a predetermined length, in addition to the first condition and at least one of the second and third conditions.

The determining module is preferred to determine that the two echo images are obtained from the towing object signals under a condition that both of the moving distances of the two echo images per predetermined period of time are within predetermined ranges, respectively, in addition to the first condition and at least one of the second and third conditions.

The determining module is preferred to determine that the two echo images are obtained from the towing object signals under a fourth condition that a length of a first echo image segment connecting the sets of representative coordinates of the two echo images corresponding to a first timing of the two or more timings is different, by less than a predetermined length, from a length of a second echo image segment connecting the sets of representative coordinates of the two echo images corresponding to a second timing of the two or more timings, and that an angle between the moving direction of one of the two echo images from the first timing to the second timing and one of the first and second echo image segments is smaller than a predetermined angle and an angle between the first and second echo image segments is smaller than a predetermined angle.

Further, the determining module is preferred to determine that the two echo images are obtained from the towing object signals under a condition that both of the first and second echo image segments are shorter than predetermined lengths, respectively, in addition to the fourth condition.

The determining module is preferred to determine that the two echo images are obtained from the towing object signals under a condition that at least one of the moving distances of the two echo images is within a predetermined range, in addition to the fourth condition.

The signal processing device is preferred to further include a representative point calculating module configured to calculate a plurality of sets coordinates of representative points of each of the two echo images at three or more timings, and a track segment generating module configured to generate, for one of the two echo images, a plurality of track segments by using the representative points of the corresponding echo image at the three or more timings, each track segment formed by connecting the representative points calculated at two continuous timings of the three or more timings. The determining module is preferred to determine that the two echo images are obtained from the towing object signals under a condition that a distance between a first target point and a first reference segment is shorter than a predetermined length and a distance between a second target point and a second reference segment is shorter than the predetermined length, the first target point being one of the representative points of the other echo image at the three or more timings, the first reference segment being one of the plurality of track segments, the second target point being the representative point calculated the next to the first target point in terms of time, the second reference segment being the track segment generated the next to the first reference segment in terms of time.

Further, the determining module is preferred to determine that the two echo images are obtained from the towing object signals under a condition that each distance between two of the representative points of one of the echo images at two continuous timings of the three or more timings is different, by less than a predetermined length, from the distance between the representative points of the other echo image at the same two continuous timings, and that a total distance that one of the echo images moves between the three or more timings is different, by less than a predetermined length, from a total distance that the other echo image moves between the three or more timings, in addition to the condition that each of the distance between the first target point and the first reference segment and the distance between the second target point and the second reference segment is shorter than the predetermined length.

According to another aspect of this disclosure, a radar apparatus is provided. The radar apparatus includes an antenna configured to receive radio waves. The radar apparatus also includes a reception device configured to receive the radio waves from the antenna and convert them into digital signals. The radar apparatus also includes the signal processing device having any of the configurations described above and configured to receive the digital signals from the reception device and process them. The radar apparatus also includes a display unit configured to display the echo images determined to be obtained from the towing object signals by the signal processing device in a manner that the echo images are recognizable as being obtained from the towing object signals caused by the pair of the towing object and the towed object.

According to this disclosure, a towing object and a towed object can be discriminated among objects on water.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A signal processing device 3 according to one embodiment of this disclosure and a radar apparatus 10 including the signal processing device 3 are described with reference to the appended drawings. The radar apparatus 10 of this embodiment is equipped, for example, in a ship (hereinafter, may be referred to as "the ship concerned" or simply as "the ship), and used to detect objects (e.g., other ships) on the sea. Further, the radar apparatus 10 of this embodiment can discriminate a towing ship and a towed ship on the sea from other ships so that an operator can identify the towing ship and the towed ship.

Towing Ship and Towed Ship

Figure 14A:
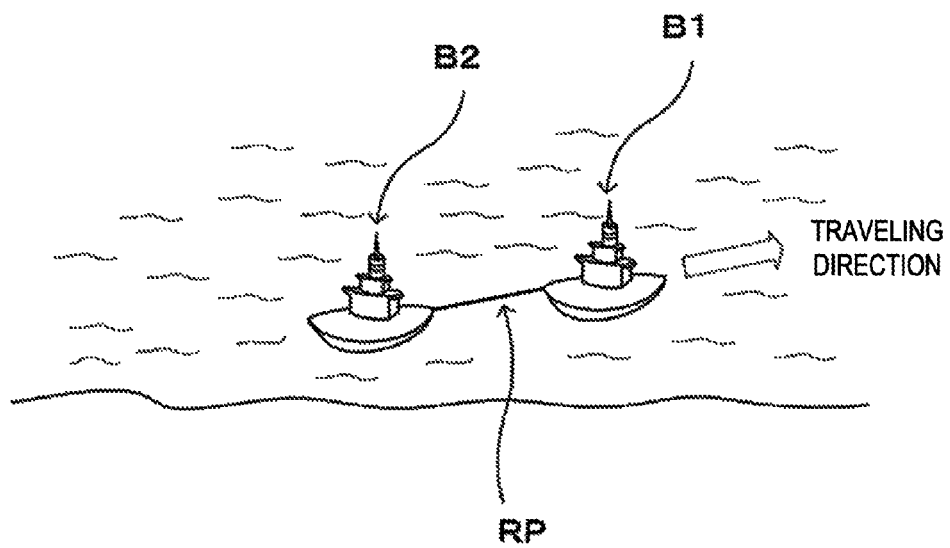
FIGS. 14A and 14B are schematic views for describing a towing ship and a towed ship.
Figure 14B:
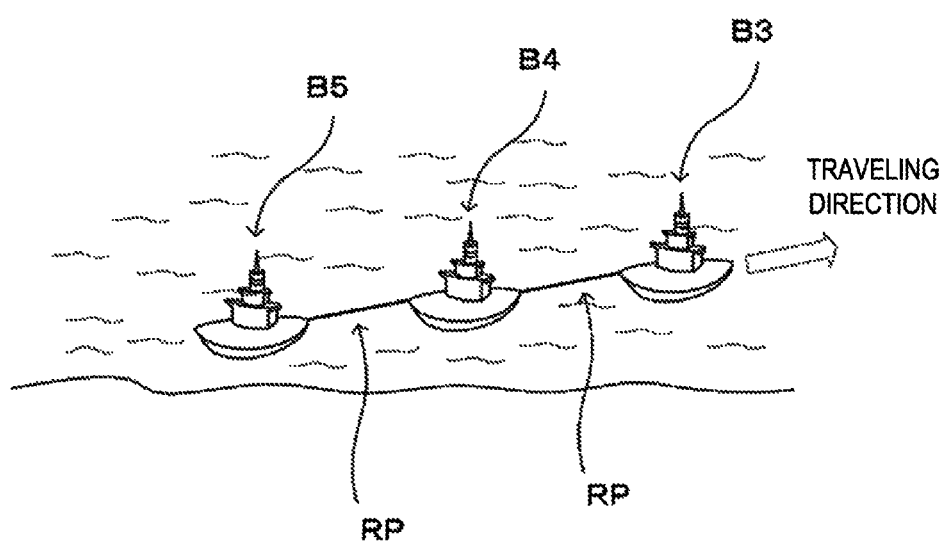

FIGS. 14A and 14B are schematic views for describing a towing ship and a towed ship, in which FIG. 14A illustrates a state in which one ship tows another ship and FIG. 14B illustrates a state in which a ship at the front in a traveling direction tows two ships connected thereto in line. The towing ship is connected with each towed ship via a rope RP that is a towing line.

Here, the towing ship and the towed ship are defined based on the relation between continuous two ships. Specifically, in the case of FIG. 14A, the ship B1 towing the other ship is defined as the towing ship, and the ship B2 that is the other ship towed by the towing ship is defined as the towed ship. Moreover, in the case of FIG. 14B, between the ships B3 and B4, the ship B3 is defined as the towing ship and the ship B4 is defined as the towed ship. Furthermore, between the ships B4 and B5, the ship B4 is defined as the towing ship and the ship B5 is defined as the towed ship.

Configuration

Figure 1:
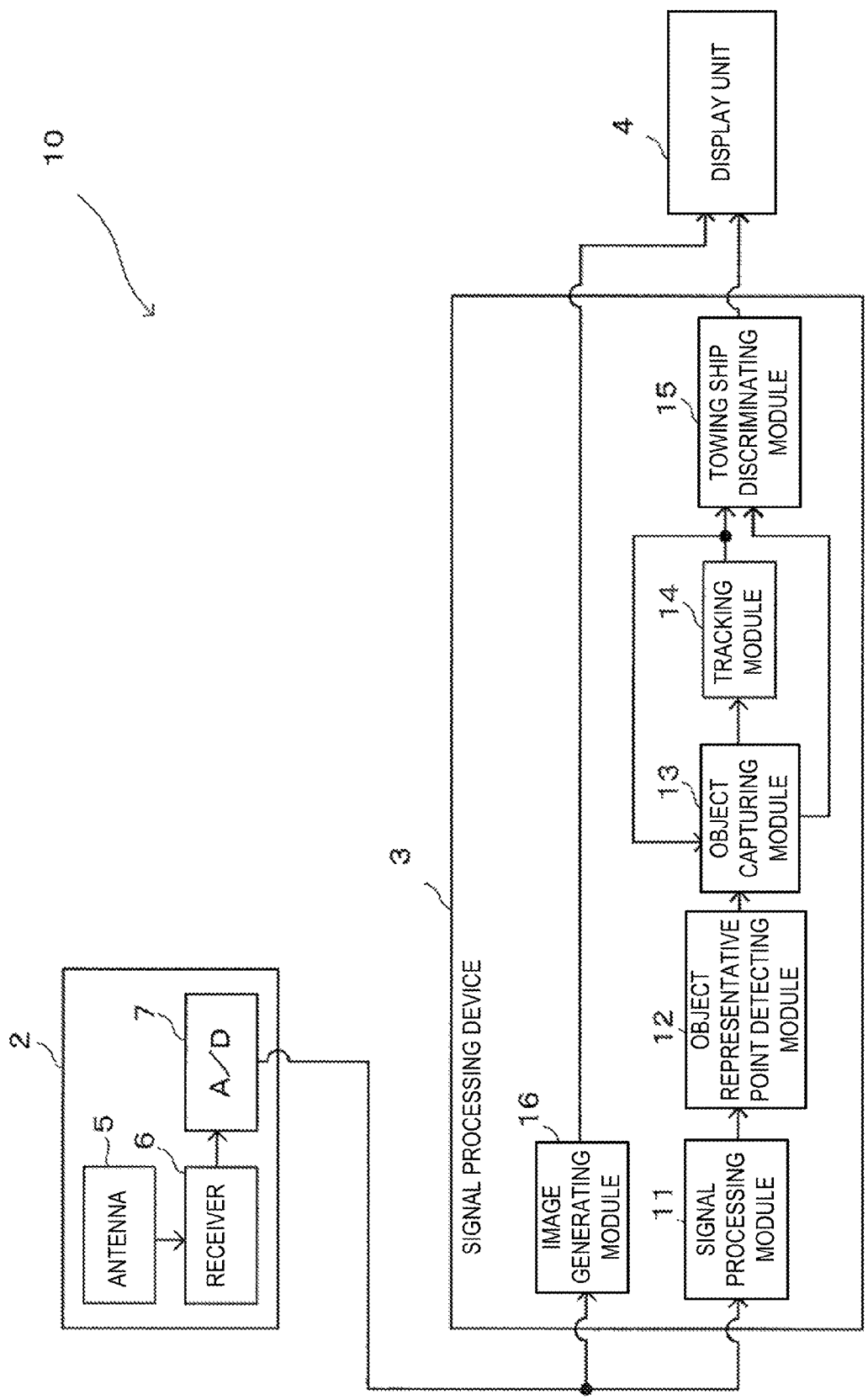
FIG. 1 is a block diagram illustrating a configuration of a radar apparatus according to one embodiment of this disclosure.

FIG. 1 is a block diagram illustrating a configuration of the radar apparatus 10 of this embodiment. As illustrated in FIG. 1, the radar apparatus 10 includes an antenna unit 2 (reception device), the signal processing device 3, and a display unit 4.

The antenna unit 2 includes an antenna 5, a receiver 6, and an A/D converter 7.

The antenna 5 is a radar antenna capable of transmitting (discharging) a strong pulsed radio wave having strong directivity. Moreover, the antenna 5 receives an echo signal (reflection wave) from an object. In other words, the antenna 5 receives the echo signal that identifies the object.

The radar apparatus 10 measures a time length from the transmission of the pulsed radio wave to the reception of the echo signal. Thus, the radar apparatus 10 can detect a distance r from the radar apparatus 10 to the object. A direction toward the object from the ship is defined as a distance direction.

The antenna 5 is rotatable about a vertical axis over 360° in a horizontal plane. The antenna 5 repeats the transception of the radio wave while changing the transmitting direction of the pulsed radio wave (while changing a rotational angle of the antenna 5). With the above configuration, the radar apparatus 10 can detect objects existing in a plane around the ship over 360°.

Note that, in the following description, operation from a transmission of a single pulsed radio wave to a transmission of the next pulsed radio wave is referred to as a "sweep." Moreover, operation of rotating the antenna by 360° while performing the transception of the radio waves is referred to as a "scan."

The receiver 6 detects and amplifies each echo signal received by the antenna 5. Among signals received by the antenna 5, the echo signal is a reflection wave from the object, caused by the transmission signal from the antenna 5. The receiver 6 outputs the amplified echo signal to the A/D converter 7. The A/D converter 7 samples the echo signal that is an analog signal, and converts it into digital data (echo data) comprised of a plurality of bits. Here, a value of the echo data includes a value of data that identifies an intensity (signal level) of the echo signal received by the antenna 5. The A/D converter 7 outputs the echo data to an image generating module 16 and a signal processing module 11 of the signal processing device 3.

The signal processing device 3 includes the signal processing module 11, an object representative point detecting module 12, an object capturing module 13 (coordinate detecting module), a tracking module 14, a towing ship discriminating module 15 (determining module), and an image generating module 16.

The image generating module 16 generates image data based on the echo data from the A/D converter 7. In this embodiment, the image generating module 16 generates PPI (Plan Position Indicator) image data. The image data generated by the image generating module 16 is outputted to the display unit 4.

The signal processing module 11 performs, for example, filtering to remove an interference component and unnecessary waveform data included in the echo data. The signal processing module 11 outputs the filtered echo data to the object representative point detecting module 12.

The object representative point detecting module 12 detects an echo image (i.e., echo data group) of the object and detects coordinates of a representative point of the echo image of the detected object. Specifically, in detecting the echo image of the object, the object representative point detecting module 12 detects whether an echo source exists at a position corresponding to the echo data. At a position where the signal level is higher than a predetermined threshold, the object representative point detecting module 12 determines that the object exists. Further, when at least a predetermined amount of data in which signal levels are higher than the predetermined threshold exists collectively, the object representative point detecting module 12 detects an area corresponding to the collective data as an area where the echo image of the object exists, and calculates, for example, a central point of the area to be a representative point. In every predetermined period of time (e.g., per scan), the object representative point detecting module 12 calculates coordinates of the representative point of the echo image of the object (if two or more objects are determined to exist in the predetermined time period, the coordinates of the representative points of the echo images of the respective two or more objects). Each representative point is outputted to the object capturing module 13. Note that, the coordinates of the representative point of the echo image of the object may be referred to as the coordinates of the object (tracked object).

The object capturing module 13 captures the representative point of the tracked object that is a tracking target. Specifically, the object capturing module 13 captures, for example, a position of the object in move, for every predetermined period of time. For example, based on the coordinates and a velocity of the tracked object at a certain timing (t-1), the object capturing module 13 estimates a position of the tracked object at a timing "t" that is after the predetermined period of time from the timing (t-1). Further, the object capturing module 13 determines the representative point of the tracked object based on the estimated position. Note that, as the velocity of the tracked object described above, for example, a velocity calculated by the tracking module 14 described later is used.

The tracking module 14 calculates the velocity of the representative point of the tracked object. For example, based on coordinates of the representative points of the echo image captured by the object capturing module 13 at two timings, respectively, the tracking module 14 calculates the velocity of the tracked object in a period of time between the two timings. Thus, the tracking module 14 is provided as a calculating module configured to calculate a moving distance (magnitude of velocity) of the object per predetermined period of time and a moving direction (direction of velocity) of the object in the predetermined time period. The velocity calculated by the tracking module 14 is outputted to the towing ship discriminating module 15 and the object capturing module 13.

The towing ship discriminating module 15 receives a plurality of tracked objects as the tracking targets, and extracts two of the plurality of tracked objects to be target objects, respectively. Further, based on the coordinates of the target objects captured by the object capturing module 13 and the velocities of the target objects calculated by the tracking module 14, the towing ship discriminating module 15 determines whether two echo images of the two target objects are detected from towing ship signals that are caused by the towing ship and the towed ship. When the two echo images of the two target objects are determined to be detected from the towing ship signals, the towing ship discriminating module 15 outputs, to the display unit 4, a towing ship notification signal to notify that the two echo images are detected from the towing ship signals. Operation of the towing ship discriminating module 15 is described later in detail.

[The display unit 4 displays the image signal (image data) generated by the image generating module 16. Moreover, the display unit 4 receives the towing ship notification signal from the towing ship discriminating module 15 and displays the two echo images detected from the towing ship signals in a manner that an operator can recognize that the two echo images are detected from the towing ship signals caused by the towing ship and the towed ship.

Operation of Towing Ship Discriminating Module

Figure 2:
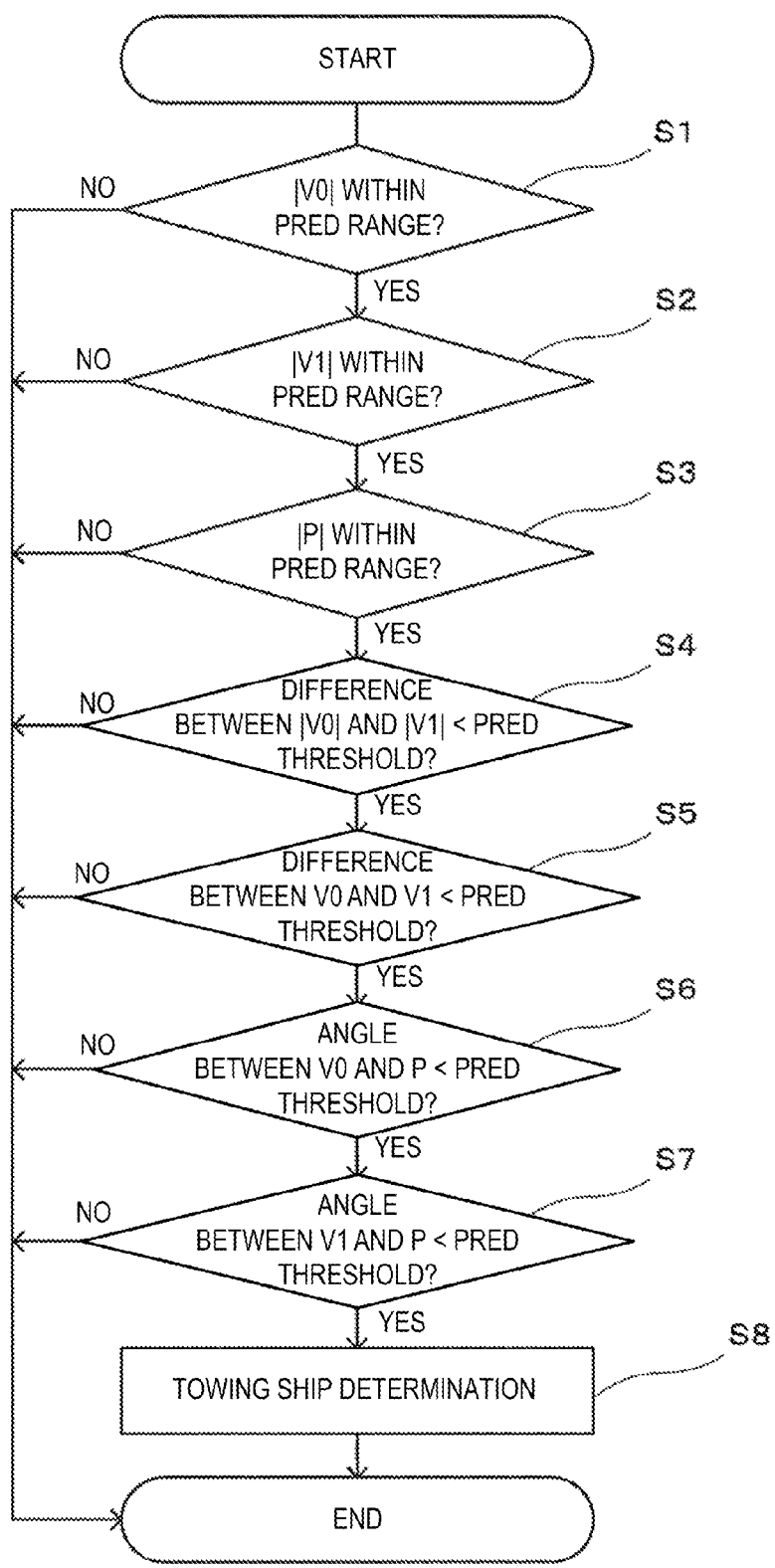
FIG. 2 is a flowchart for describing operation of a towing ship discriminating module of the radar apparatus in FIG. 1.

FIG. 2 is a flowchart illustrating the operation of the towing ship discriminating module 15. Among the representative points of the plurality of echo images in a predetermined area, the towing ship discriminating module 15 extracts two representative points of two echo images to be determination targets (target objects), and determines whether the two determination targets are detected from the towing ship signals based on the flow in FIG. 2. The towing ship discriminating module 15 performs the two point extraction for all possible combinations in the predetermined area, and the towing ship discriminating module 15 sequentially determines whether the two points are detected from the towing ship signals for these combinations.

Figure 3:
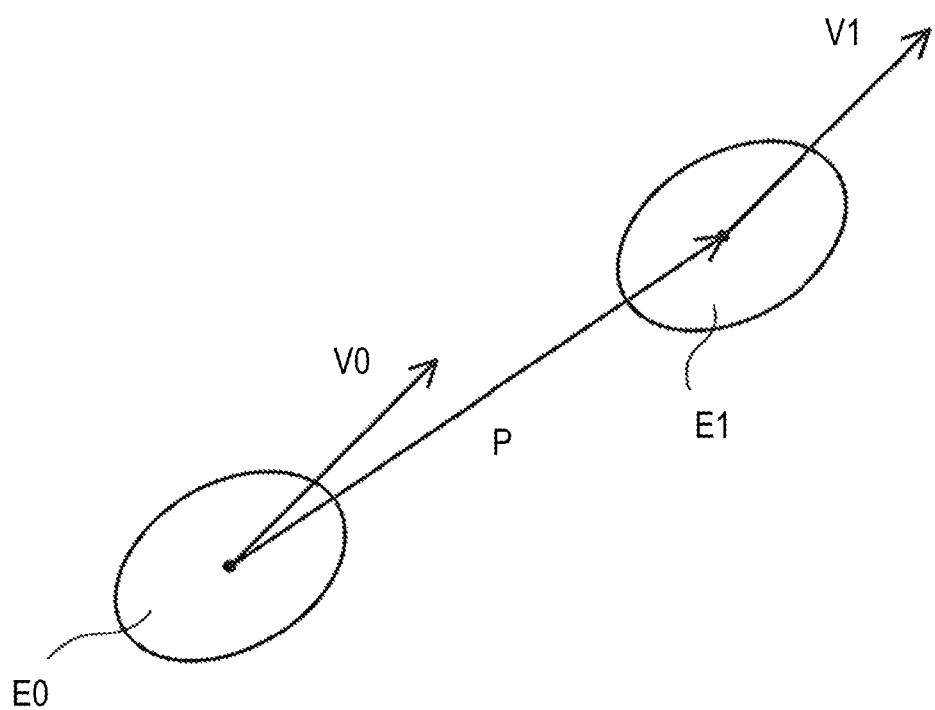
FIG. 3 is a schematic view illustrating two objects as determination targets of whether signals corresponding to the two objects are towing ship signals at a signal processing module of the radar apparatus in FIG. 1.

FIG. 3 is a schematic view illustrating the two objects as the determination targets at the towing ship discriminating module 15. Hereinafter, by using objects 0 and 1 as the determination targets, an echo image E0 of an object 0 and an echo image E1 of an object 1 in FIG. 3 are described as an example.

First, at S1 and S2, the towing ship discriminating module 15 determines whether both velocities of the two representative points as the determination targets, are within an estimatable velocity range for the towing ship and the towed ship.

Specifically, at S1, the towing ship discriminating module 15 determines whether the magnitude of a velocity of one of the objects 0 and 1 (here, a velocity V0 of the object 0) is within a predetermined range. The magnitude of the velocity V0 is referred to as "|V0|." If |V0| is outside the predetermined range, the two echo images E0 and E1 of the objects 0 and 1 are determined to be not detected from the towing ship signals, and the flow ends. On the other hand, if |V0| is within the predetermined range, next, at S2, the towing ship discriminating module 15 determines whether the magnitude of a velocity of the other object (here, a velocity V1 of the object 1) is within a predetermined range. The magnitude of the velocity V1 is referred to as "|V1|." If |V1| is outside the predetermined range, the two echo images E0 and E1 of the objects 0 and 1 are determined to be not detected from the towing ship signals, and the flow ends. On the other hand, if |V1| is within the predetermined range, the flow proceeds to S3. Note that, the predetermined ranges for V0 and V1 may be the same range.

Note that, if one or both of the velocities of the objects 0 and 1 are outside the corresponding predetermined ranges at S1 and S2, the corresponding object may be excluded from the targets to be extracted in the two point extraction described above. Thus, the object that has already been determined to be not detected from the determination of the towing ship signal can be excluded from the determination targets, and therefore, the process speed of the towing ship discriminating module 15 can be increased.

Next, at S3, the towing ship discriminating module 15 determines whether a distance between the objects 0 and 1 is within an estimatable distance range for the relation between a towing ship and a towed ship. Specifically, at S3, the towing ship discriminating module 15 determines whether a length of a target object segment P is within a predetermined range. The target object segment P is a segment connecting the representative points of the objects 0 and 1 with each other, and the length of the target object segment P is referred to as "|P|." If |P| is outside the predetermined range, the two echo images E0 and E1 of the objects 0 and 1 are determined to be not detected from the towing ship signals, and the flow ends. On the other hand, if |P| is within the predetermined range, the flow proceeds to S4.

Next, at S4, the towing ship discriminating module 15 determines whether the objects 0 and 1 move at substantially the same speed. Specifically, the towing ship discriminating module 15 determines whether a first condition that a difference between |V0| and |V1| is smaller than a predetermined threshold, is satisfied. If the difference between |V0| and |V1| exceeds the predetermined threshold, the two echo images E0 and E1 of the objects 0 and 1 are determined to be not detected from the towing ship signals, and the flow ends. On the other hand, if the difference between |V0| and |V1| is smaller than the predetermined threshold, the flow proceeds to S5.

Next, from S5 to S7, the towing ship discriminating module 15 determines whether the moving direction of the object 0, the moving direction of the object 1, and an extending direction of the target object segment P are substantially the same. Specifically, at S5, the towing ship discriminating module 15 determines whether an angle between the direction of V0 and the direction of V1 is smaller than a predetermined threshold (predetermined angle), at S6, the towing ship discriminating module 15 determines whether an angle between the direction of V0 and the direction of P is smaller than a predetermined threshold (predetermined angle), and at S7, the towing ship discriminating module 15 determines whether an angle between the direction of V1 and the direction of P is smaller than a predetermined threshold (predetermined angle). At any one of S5, S6 and S7, if the angle between the two directions described above is determined to exceed the corresponding predetermined angle, the two echo images E0 and E1 of the objects 0 and 1 are determined to be not detected from the towing ship signals, and the flow ends. On the other hand, at S5, S6 and S7, if all the angles between the two directions described above are determined to be smaller than the respective predetermined angles, the two echo images E0 and E1 of the objects 0 and 1 are determined to be detected from the towing ship signals (S8), and the flow ends. Note that, one of S5, S6 and S7 may be omitted. Moreover, either one of satisfying S5 and S6 and satisfying S5 and S7 is a second condition, and satisfying S6 and S7 is a third condition. Also, the predetermined thresholds used at S5 to S7 may be the same value.

By the above flow, regarding two of the plurality of echo images, the towing ship discriminating module 15 determines whether the two echo images are detected from the towing ship signals. Then, as described above, the towing ship discriminating module 15 performs the two point extraction for the rest of all the possible combinations in the predetermined area, and the towing ship discriminating module 15 sequentially determines, for these combinations, whether the two points are detected from the towing ship signals.

Figure 4:
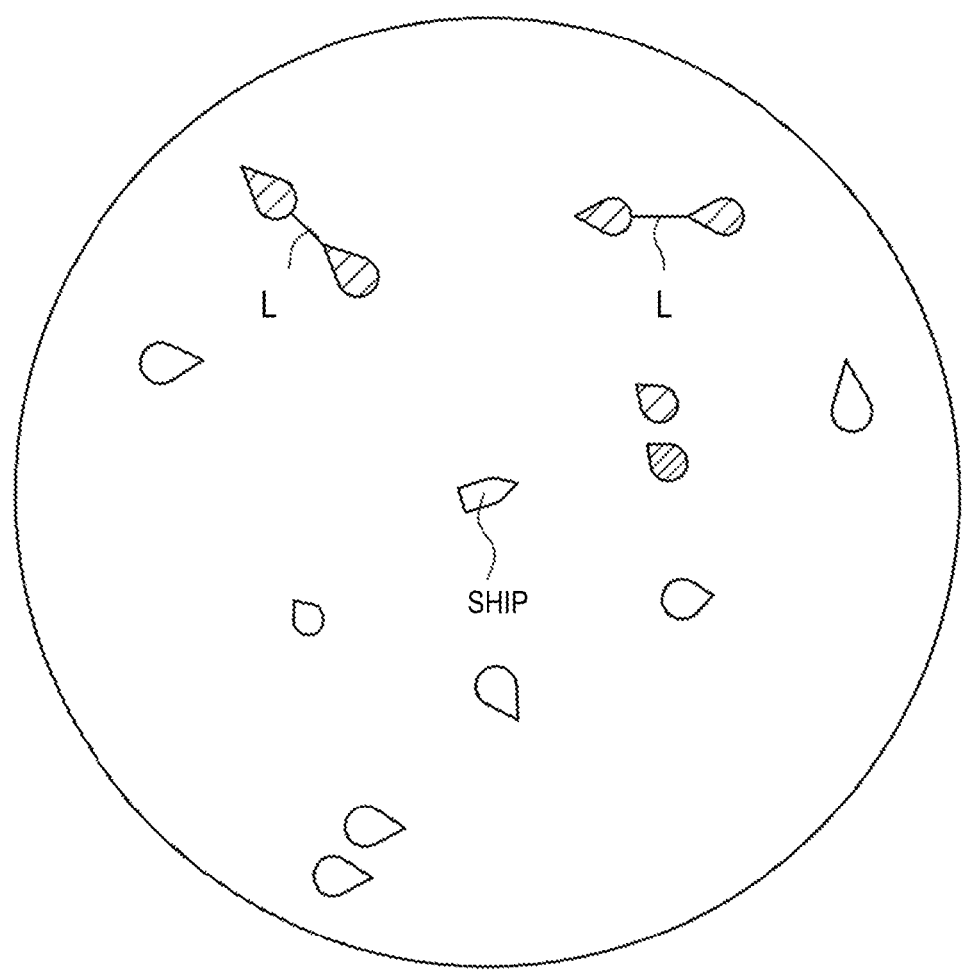
FIG. 4 is a view of one example of a screen displayed on a display unit.

FIG. 4 is a view of one example of a screen displayed on the display unit 4. The display unit 4 displays objects detected to exist around the ship concerned, centering on the ship concerned. The display unit 4 of the radar apparatus 10 of this embodiment displays an object with high risk in red (with comparatively fine hatching in FIG. 4). Specifically, an object having a high possibility of collision with the ship if the ship continues to travel at a current speed and a current azimuth, is displayed in red. Moreover, the display unit 4 displays an object with slightly high risk in yellow (with comparatively rough hatching in FIG. 4). Specifically, an object having a slightly high possibility of collision with the ship if the ship continues to travel at the current speed and the current azimuth, and an object considered that the operator needs to be alerted thereof are displayed in yellow.

Further, as illustrated in FIG. 4, the display unit 4 displays the two objects determined to be detected from the towing ship signals by the towing ship discriminating module 15 in yellow (with comparatively rough hatching in FIG. 4), and also displays straight lines L, each connecting the two objects. In this manner, the operator can be alerted that the two objects connected by the straight line L have a high possibility of being in the relation between the towing ship and the towed ship.

Effects

As above, with the signal processing device 3 of this embodiment, the coordinates of the representative points are obtained at two or more timings, respectively, for each of the two echo images that are the determination targets of whether they are detected from the towing ship signals, and whether the two echo images are detected from the towing ship signals is determined based on the obtained coordinates. By using the coordinates of the two echo images obtained at the plurality of timings as above, a behavior of each echo image (magnitude and direction of velocity V0 in this embodiment), the relative positions of the echo images (target object segment P in this embodiment), and the like, can be grasped. Thus, by determining whether the behaviors of the two echo images and the relative positions thereof are in relation likely to be the relation between a towing ship and a towed ship as described above, whether the two echo images are the towing ship and the towed ship can be determined.

Therefore, the towing ship and the towed ship can be discriminated among objects on the sea.

Moreover, with the signal processing device 3 of this embodiment, it is determined that the echo images E0 and E1 are detected from the towing ship signals under the condition that the difference between the magnitudes of the velocities V0 and V1 of the respective echo images E0 and E1 is within the predetermined range. With the towing ship and the towed ship, since they are connected with each other by the towing line (e.g., rope RP) and one of the ships pulls the other ship as illustrated in FIGS. 14A and 14B, the speeds of the two ships substantially match. Therefore, by setting the condition described above, the two echo images having the possibility of being in the relation between the towing ship and the towed ship can be suitably included in the candidates of the towing ship signals.

Moreover, with the signal processing device 3 of this embodiment, the echo images E0 and E1 are determined to be detected from the towing ship signals under the condition that at least two of the angle between the direction of the velocity V0 and the direction of the velocity V1, the angle between the direction of the velocity V0 and the target object segment P, and the angle between the direction of the velocity V1 and the target object segment P, are smaller than the predetermined angle. With the towing ship and the towed ship, since one of them pulls the other ship by being connected with each other via the rope as described above, the direction of the rope and the directions of the velocities of the echo images E0 and E1 substantially match. Therefore, by setting the condition described above, the two echo images having the possibility of being in the relation between the towing ship and the towed ship can be suitably included in the candidates of the towing ship signals.

Moreover, with the signal processing device 3 of this embodiment, the echo images E0 and E1 are determined to be detected from the towing ship signals under the condition that the target object segment P is shorter than the predetermined length. In the relation between the towing ship and the towed ship, the length of an actual rope connecting therebetween does not exceed, for example, 1 km and is shorter than a predetermined length (e.g., less than a few hundred meters). Therefore, by setting the condition described above, the two echo images separated from each other by an interval that is realistically estimatable for the relation between the towing ship and the towed ship can be suitably included in the candidates of the towing ship signals.

Moreover, with the signal processing device 3 of this embodiment, the echo images E0 and E1 are determined to be detected from the towing ship signals under the condition that the magnitudes of the velocities V0 and V1 are within the respective predetermined ranges. In this manner, the echo images E0 and E1 of which magnitudes of the velocities are estimatable for the towing ship and the towed ship can be suitably included in the candidates of the towing ship signals.

Moreover, with the radar apparatus 10 of this embodiment, the two echo images determined to be detected from the towing ship signals are displayed on the display unit 4 in a different color from the other echo images and in a state where the two images are connected with each other by the straight line L. Thus, the operator can visually grasp the situation that there is a possibility of the two echo images being the towing ship and the towed ship. Therefore, the operator can control the ship concerned to avoid the area where the straight line L is displayed, so as to prevent the ship from being caught by the towing line (rope).

Although the embodiment of this disclosure is described above, this disclosure is not limited to this embodiment, and unless deviating from the spirit and scope of this disclosure, various changes may be applied.

Modification 1

Figure 5:
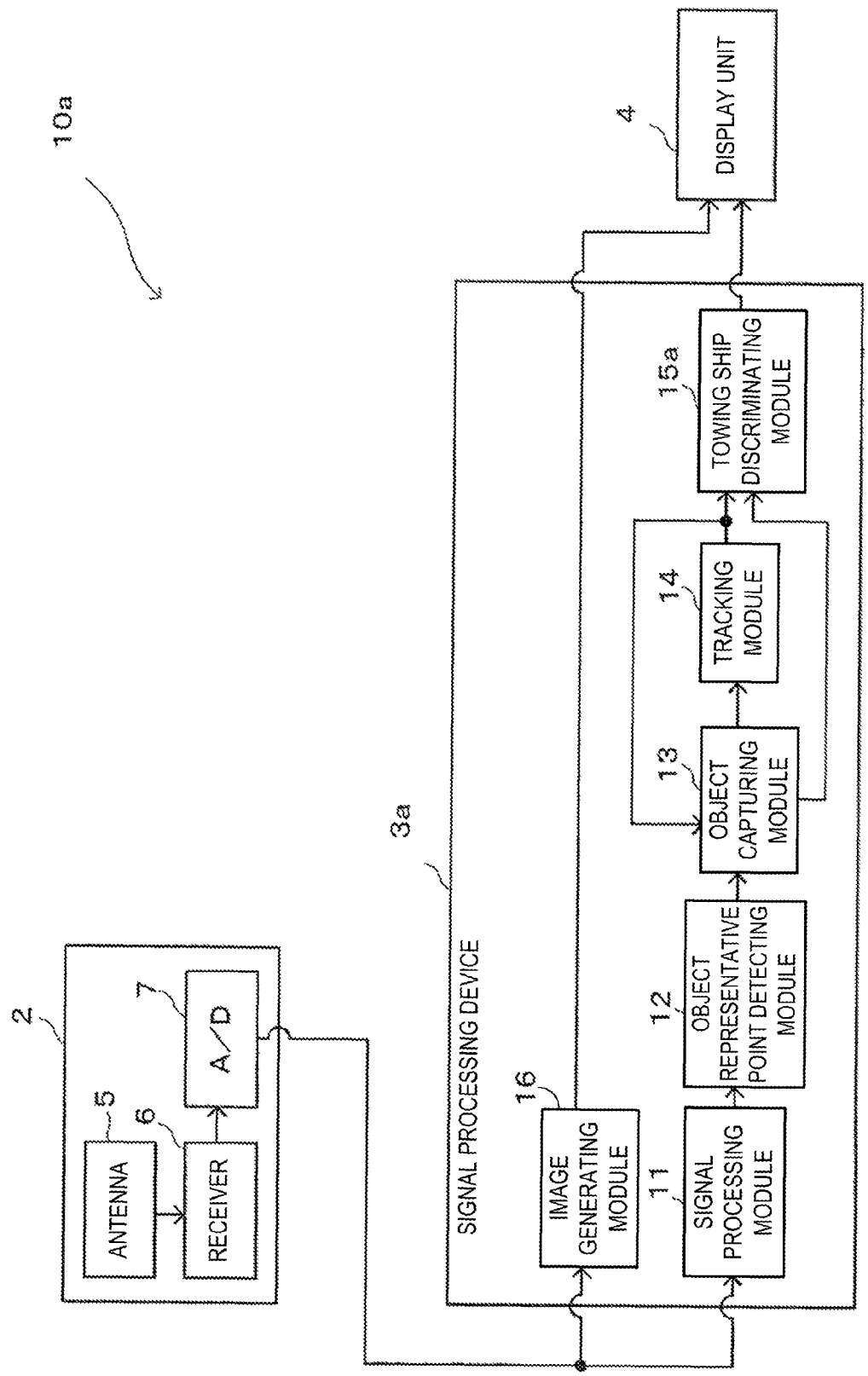
FIG. 5 is a block diagram illustrating a configuration of a radar apparatus according to a modification.

FIG. 5 is a block diagram illustrating a configuration of a radar apparatus 10a of a modification. With the radar apparatus 10a of this modification, the operation of the towing ship discriminating module is different from that in the above embodiment. Hereinafter, the difference from the above embodiment is mainly described, and for the configurations similar to or same as the above embodiment, the same reference numerals as the above embodiment are denoted in the appended drawings and/or the configurations are briefly described by using the same reference numerals as the above embodiment, and the detailed description thereof is omitted.

A towing ship discriminating module 15a, similar to the towing ship discriminating module 15 of the above embodiment, determines whether two echo images caused by two target objects as determination targets are detected from towing ship signals based on coordinates of the corresponding tracked objects captured by the object capturing module 13 and velocities of the corresponding tracked objects calculated by the tracking module 14, the towing ship signals caused by a towing ship towing another ship and a towed ship being the other ship, respectively. However, the operation of the towing ship discriminating module 15a of this modification is greatly different from that of the towing ship discriminating module 15 of the above embodiment. Hereinafter, the operation of the towing ship discriminating module 15a is described.

Operation of Towing Ship Discriminating Module

Figure 6:
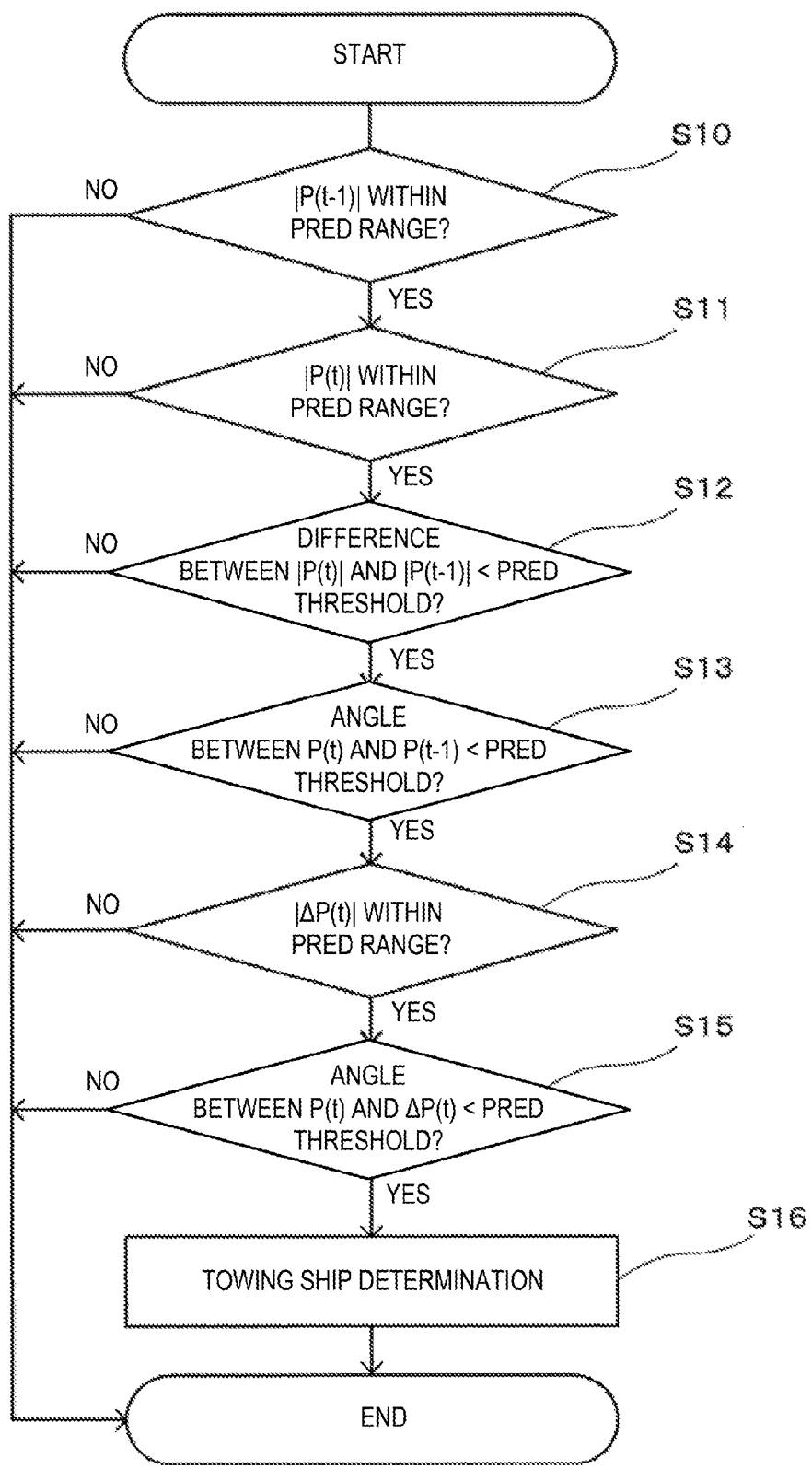
FIG. 6 is a flowchart for describing operation of a towing ship discriminating module of the radar apparatus in FIG. 5.

FIG. 6 is a flowchart illustrating the operation of the towing ship discriminating module 15a. The towing ship discriminating module 15a, similar to the above embodiment, extracts two of representative points of a plurality of echo images in a predetermined area, to be the determination targets. Further, the towing ship discriminating module 15a determines whether the two determination targets are detected from the towing ship signals based on the flow in FIG. 6. The towing ship discriminating module 15a, similar to the above embodiment, performs the two point extraction for all possible combinations in the predetermined area, and the towing ship discriminating module 15a sequentially determines, for these combinations, whether the two points are detected from the towing ship signals.

Figure 7:
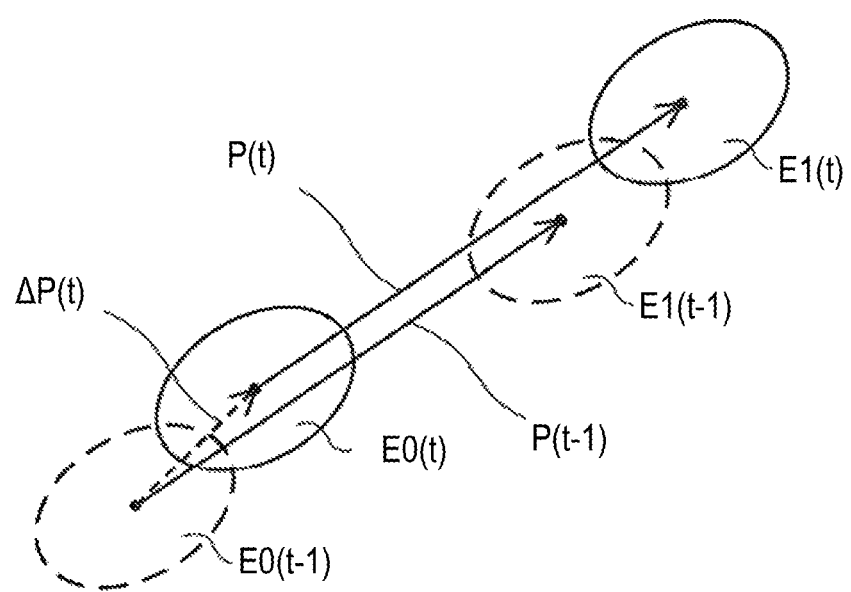
FIG. 7 is a schematic view illustrating two objects as determination targets of whether signals corresponding to the two objects are towing ship signals at a signal processing module of the radar apparatus in FIG. 5.

FIG. 7 is a schematic view illustrating the two objects as the determination targets at the towing ship discriminating module 15a. Hereinafter, by using objects 0 and 1 as the determination targets, an echo image E0 of the object 0 and an echo image E1 of the object 1 in FIG. 7 are described as an example. Note that, in FIG. 7, the echo image of the object 0 and the echo image of the object 1 at a certain timing "t" (first timing) are E0(t) and E1(t), respectively. Moreover, the echo image of the object 0 and the echo image of the object 1 at a timing t-1 (second timing) earlier than the timing t by a predetermined period of time are E0(t-1) and E1(t-1), respectively.

First, at S10 and S11, the towing ship discriminating module 15a determines whether a distance between the two objects at the timing t-1 and a distance between the two objects at the timing t are both within an estimatable distance range for the relation between a towing ship and a towed ship.

Specifically, at S10, the towing ship discriminating module 15a determines whether a length of a target object segment P(t-1) (first target object segment) is within a predetermined range. The target object segment P(t-1) is a segment connecting the representative point of the echo image E0(t-1) of the object 0 and the representative point of the echo image E1(t-1) of the object 1 with each other at the timing t-1, and the length of the target object segment P(t-1) is referred to as "|P(t-1)|." If |P(t-1)| is outside the predetermined range, the two echo images E0 and E1 are determined to be not detected from the towing ship signals, and the flow ends. On the other hand, if |P(t-1)| is within the predetermined range, next at S11, the towing ship discriminating module 15a determines whether a length of a target object segment P(t) (second target object segment) is within a predetermined range. The target object segment P(t) is a segment connecting a representative point of the echo image E0(t) of the object 0 and a representative point of the echo image E1(t) of the object 1 with each other at the timing t, and the length of the target object segment P(t) is referred to as "|P(t)|." If |P(t)| is outside the predetermined range, the two echo images E0 and E1 are determined to be detected from the towing ship signal, and the flow ends. On the other hand, if |P(t)| is within the predetermined range, the flow proceeds to S12. Note that, the predetermined ranges for |P(t-1)| and |P(t)| may be the same range.

Next, at S12, the towing ship discriminating module 15a determines whether the distance between the objects 0 and 1 greatly changes with time. Specifically, at S12, the towing ship discriminating module 15a determines whether a difference between the length |P(t-1)| of the first target object segment P(t-1) and the length |P(t)| of the second target object segment P(t) is smaller than a predetermined threshold (predetermined length). If the difference between |P(t-1)| and |P(t)| exceeds the predetermined length, the two echo images E0 and E1 are determined to be not detected from the towing ship signals, and the flow ends. On the other hand, if the difference between |P(t-1)| and |P(t)| is smaller than the predetermined length, the flow proceeds to S13.

Next, at S13, the towing ship discriminating module 15a determines, assuming that the objects 0 and 1 are the respective towing and towed ships, whether a course changing angle in a predetermined period of time is smaller than an estimatable angle. Specifically, at S13, the towing ship discriminating module 15a determines whether an angle between P(t) and P(t-1) is smaller than a predetermined threshold (predetermined angle). If the angle between P(t) and P(t-1) exceeds the predetermined angle, the two echo images E0 and E1 are determined to be not detected from the towing ship signals, and the flow ends. On the other hand, if the angle between P(t) and P(t-1) is smaller than the predetermined angle, the flow proceeds to S14.

Next, at S14, the towing ship discriminating module 15a determines whether a distance that one of the objects moves per predetermined time period is within an estimatable distance range for either one of the towing ship and the towed ships. Specifically, at S14, the towing ship discriminating module 15a determines whether a length of a vector ΔP(t) is within a predetermined range. The length of the vector ΔP(t) is a distance that the echo image of one of the objects (the echo image E0 of the object 0 in this modification) moves from the timing t-1 to the timing t, and the length of the vector ΔP(t) is referred to as "|ΔP(t)|." |ΔP(t)| is outside the predetermined range, it is determined that the two echo images E0 and E1 are not detected from the towing ship signals, and the flow ends. On the other hand, if |ΔP(t)| is within the predetermined range, the flow proceeds to S15. Note that, at S14, it may be determined whether the length of the vector that the echo image E1 of the other object 1 moves from the timing t-1 to the timing t is within the predetermined range.

Next, at S15, the towing ship discriminating module 15a determines, assuming that the objects 0 and 1 are the respective towing and towed ships, whether an angle between the direction in which the towing line extends and the traveling direction of the towed ship is within an estimatable angle range. Specifically, at S15, the towing ship discriminating module 15a determines whether the angle between P(t) and ΔP(t) is smaller than a predetermined angle. If the angle between P(t) and ΔP(t) exceeds the predetermined angle, the two echo images E0 and E1 are determined to be not detected from the towing ship signals, and the flow ends. On the other hand, if the angle between P(t) and ΔP(t) is smaller than the predetermined angle, the two echo images E0 and E1 are determined to be detected from the towing ship signals (S16), and the flow ends.

By the above flow, regarding two of the plurality of echo images, the towing ship discriminating module 15a determines whether the two echo images are detected from the towing ship signals. Then, similar to the above embodiment, the towing ship discriminating module 15a performs the two point extraction for the rest of all the possible combinations in the predetermined area, and the towing ship discriminating module 15a sequentially determines, for these combinations, whether the two points are detected from the towing ship signals.

Further, the display unit 4 of this modification also displays the two objects determined to be detected from the towing ship signals by the towing ship discriminating module 15a in yellow (with comparatively rough hatching in FIG. 4), and also displays straight lines L, each connecting one of the pairs of the two objects. In this manner, the operator can be alerted that the two objects connected therebetween by the straight line L have a high possibility of being in the relation between the towing ship and the towed ship.

Effects

As above, with the signal processing device 3a of this modification, similar to the above embodiment, the coordinates of the representative point are obtained at two or more timings for each of the two echo images, and whether the two echo images are detected from the towing ship signals is determined based on the obtained coordinates. Thus, similar to the above embodiment, by determining whether the behaviors of the respective echo images and the relative positions thereof which can be grasped based on the coordinates are in relation likely to be the relation between a towing ship and a towed ship as described above, whether the two echo images are detected from the towing ship and the towed ship can be determined.

Moreover, with the signal processing device 3a of this modification, the two echo images are determined to be detected from the towing ship signals under the condition (fourth condition) that the difference between the distance (first target object segment P(t-1)) between the representative points of the two echo images E0 and E1 at the timing (t-1) and the distance (second target object segment P(t)) between the representative points of the two echo images E0 and E1 at the timing t is smaller than the predetermined length. When the two echo images are in the relation between the towing ship and the towed ship, the distance between the two echo images is substantially constant regardless of the lapse of time. Therefore, by setting the condition described above, the echo images E0 and E1 with substantially constant distance therebetween over time can be suitably included in the candidates of the towing ship signals.

Moreover, with the signal processing device 3a of this modification, the two echo images are determined to be detected from the towing ship signals under the condition (fourth condition that the angle between the moving direction of one of the two echo images E0 and E1 and one of the first target object segment P(t-1) and the second target object segment P(t), and the angle between the first target object segment P(t-1) and the second target object segment P(t) are smaller than the predetermined angles, respectively. With the towing ship and the towed ship, since one of them pulls the other by being connected with each other via the rope as described above, the moving directions thereof and the extending direction of the target object segments thereof substantially match. Therefore, by setting the condition described above, the two echo images having the possibility of being in the relation between the towing ship and the towed ship can be suitably included in the candidates of the towing ship signals.

Modification 2

Figure 8:
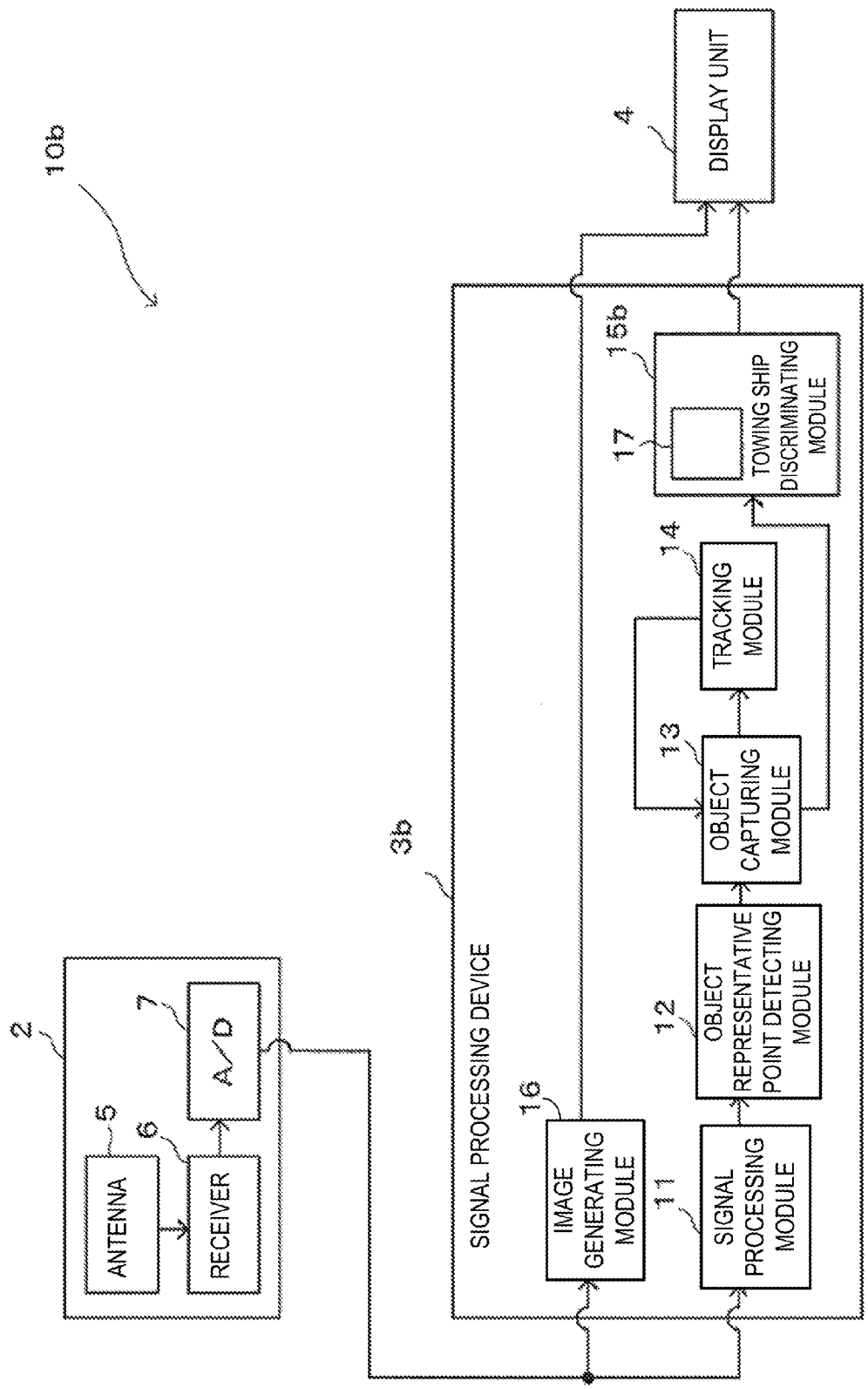
FIG. 8 is a block diagram illustrating a configuration of a radar apparatus according to another modification.

FIG. 8 is a block diagram illustrating a configuration of a radar apparatus 10b according to another modification. A towing ship discriminating module 15b of the radar apparatus 10b of this modification determines, based on tracks of two target objects as determination targets, whether two echo images caused by the two target objects are detected from towing ship signals. More specifically, the towing ship discriminating module 15b determines that the echo images caused by the two target objects are detected from the towing ship signals when the tracks of the two target objects substantially match with each other.

Therefore, with the radar apparatus 10a of this modification, the configuration and the operation of the towing ship discriminating module are different from those in the above embodiment and the above modification. Hereinafter, the difference from the above embodiment and the above modification is mainly described, and for the configurations similar to or same as the above embodiment and the above modification, the same reference numerals as the above embodiment and the above modification are denoted in the appended drawings and/or the configurations are briefly described by using the same reference numerals as the above embodiment and the above modification, and the detailed description thereof is omitted.

The towing ship discriminating module 15b includes a track segment generating module 17. Among representative points of an echo image at a plurality of timings, the track segment generating module 17 connects the representative points of the echo image that are continuous with time, to generate a plurality of track segments.

The towing ship discriminating module 15b, different from the towing ship discriminating modules 15 and 15a of the above embodiment and the modification, determines whether the two echo images caused by the two target objects (determination targets) are the towing ship signals based on the coordinates of the tracked objects captured by the object capturing module 13. In other words, the towing ship discriminating module 15b performs the towing ship determination without directly using the velocities of the target objects calculated by the tracking module 14. In this modification, the velocities of the corresponding tracked objects calculated by the tracking module 14 are used for the object capturing module 13 to capture the coordinates of the tracked objects.

Note that, in this modification, the tracking module 14 may be omitted from the configuration of the radar apparatus 10b. In this case, the object capturing module 13 may capture the target objects by utilizing, for example, an AIS (Automatic Identification System).

The object capturing module 13 captures coordinates of the tracked object as the tracking target at different timings (e.g., per scan), for each tracked object. Then, the towing ship discriminating module 15b determines whether the two echo images caused by the two target objects are detected from the towing ship signals, based on the coordinates of each of the two target objects (determination targets) at the different timings captured by the object capturing module 13.

Operation of Towing Ship Discriminating Module

Figure 9:
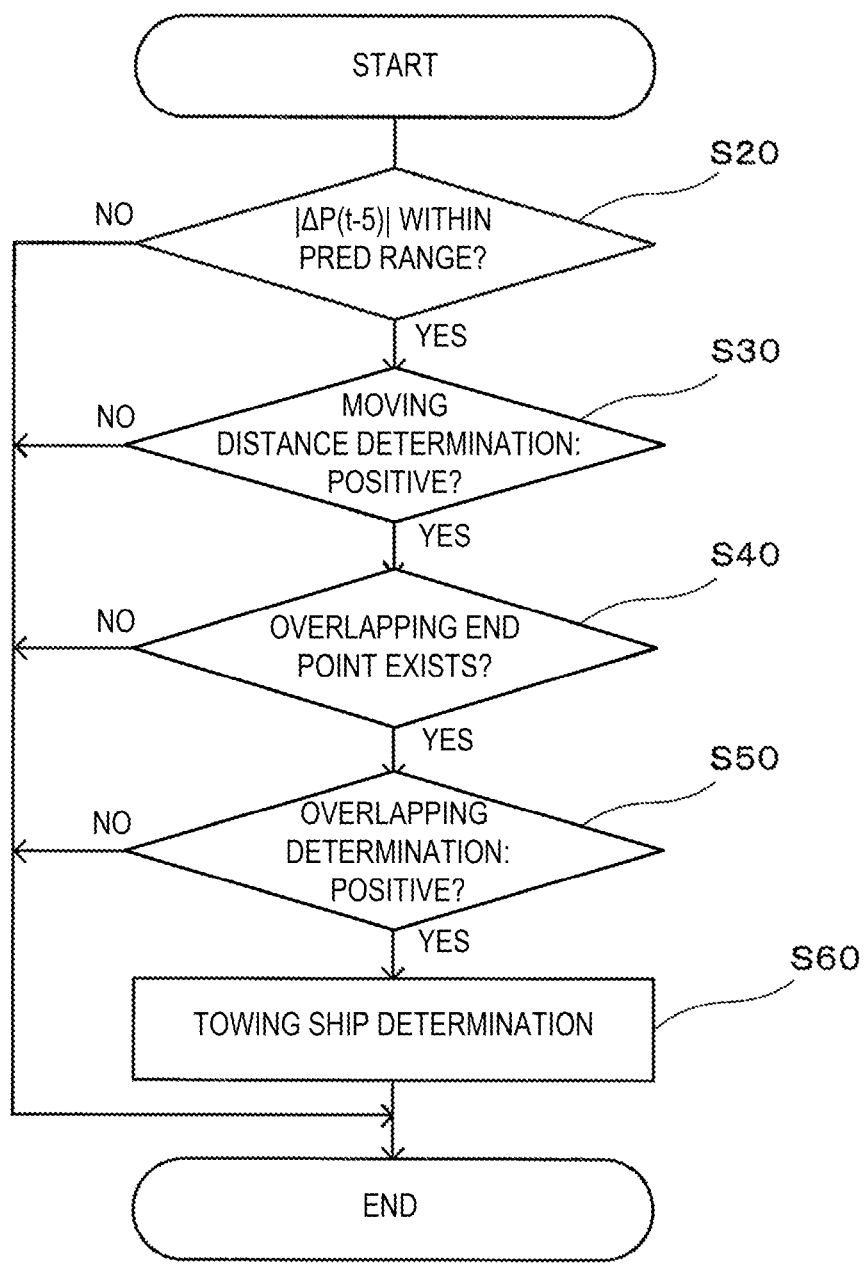
FIG. 9 is a flowchart for describing operation of a towing ship discriminating module of the radar apparatus in FIG. 8.

FIG. 9 is a flowchart illustrating the operation of the towing ship discriminating module 15b. The towing ship discriminating module 15b, similar to the above embodiment, extracts two of representative points of a plurality of echo images in a predetermined area and determines whether the two echo images are detected from the towing ship signals based on the flow in FIG. 9. The towing ship discriminating module 15b, similar to the above embodiment, performs the two point extraction for all possible combinations in the predetermined area, and the towing ship discriminating module 15a sequentially determines, for these combinations, whether the two points are detected from the towing ship signals.

Figure 10:
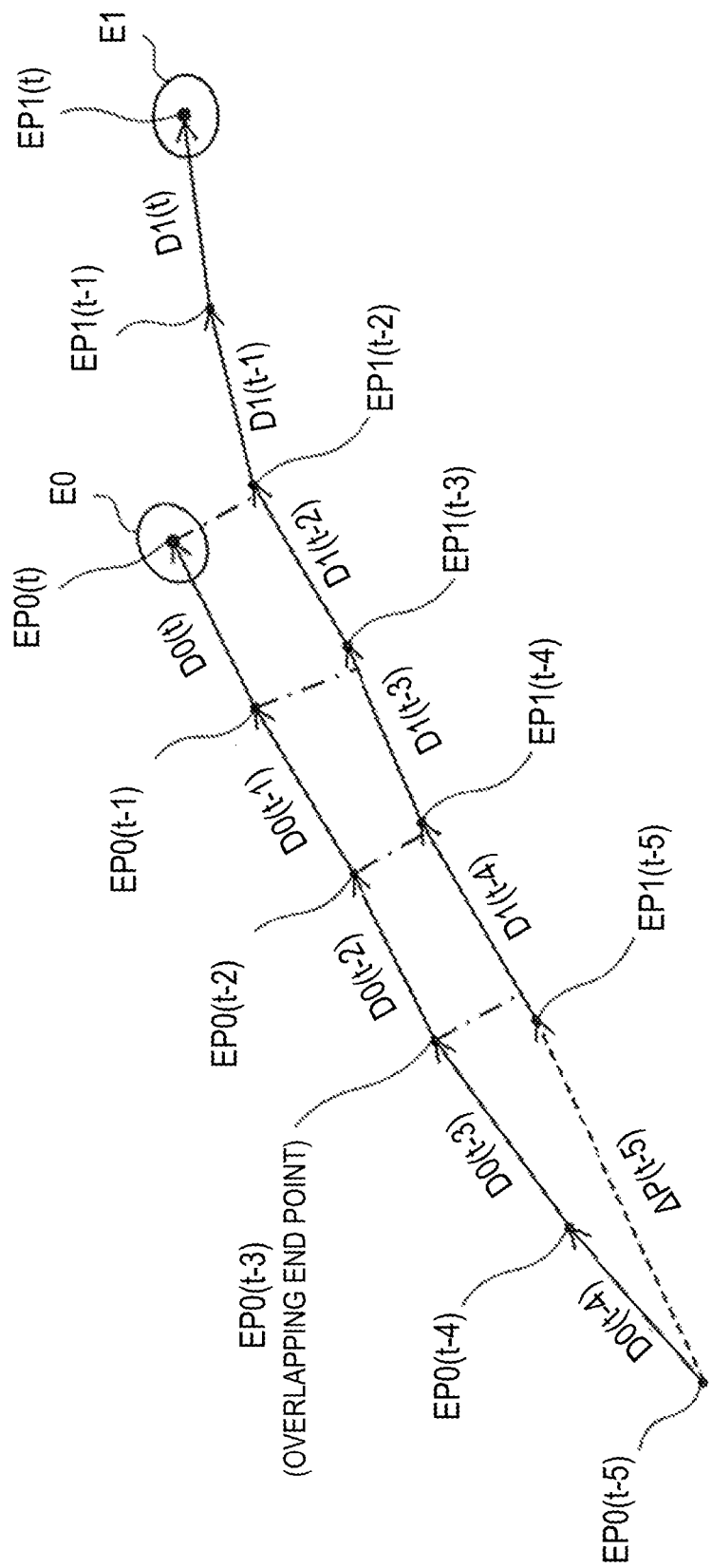
FIG. 10 is a schematic view illustrating two objects as determination targets of whether signals corresponding to the two objects are towing ship signals at a signal processing module of the radar apparatus in FIG. 8.

FIG. 10 is a schematic view illustrating the two objects as the determination targets at the towing ship discriminating module 15b. Hereinafter, by using objects 0 and 1 as the determination targets, an echo image E0 of the object 0 and an echo image E1 of the object 1 in FIG. 10 are described as an example. In FIG. 10, representative points (EP0($t$-5), EP0($t$-4), . . . , EP0($t$)) of the echo image E0 of the object 0 at six continuous timings (t-5, t-4, . . . , t, from the earliest timing) and representative points (EP1($t$-5), EP1($t$-4), . . . , EP1($t$)) of the echo image E1 of the object 1 at the six continuous timings (t-5, t-4, . . . , t, from the earliest timing) are illustrated. Segments connecting the representative points of the echo image E0 at the respective timings in FIG. 10 substantially match with the track that the echo image E0 moves from the timing (t-5) to the timing t. Similarly, segments connecting the representative points of the echo image E1 at the respective timings substantially match with the track that the echo image E1 moves from the timing (t-5) to the timing t.

First, at S20, the towing ship discriminating module 15$b$ determines whether the distance between the two objects at a certain timing (e.g., the timing t-5) is an estimatable distance for the relation between a towing ship and a towed ship.

[Specifically, at S20, the towing ship discriminating module 15$b$ determines whether a distance |ΔP(t-5)| between the representative point EP0($t$-5) of the echo image E0($t$-5) and the representative point EP1($t$-5) of the echo image E1($t$-5) at the timing t-5 is within a predetermined range. If |ΔP(t-5)| is outside the predetermined range, the two echo images E0 and E1 are determined to be not detected from the towing ship signals, and the flow ends. On the other hand, if |ΔP(t-5)| is within the predetermined range, the flow proceeds to S30.

Next, the towing ship discriminating module 15$b$ performs a determination (moving distance determination) of whether the echo images E0 and E1 move substantially the same distance in the same time slot as each other. Specifically, at S30, the towing ship discriminating module 15$b$ determines whether the distance between the representative points of one of the echo images at two continuous timings and the distance between the representative points of the other echo image at the same two continuous timings are not different from each other more than a predetermined length. To describe more specifically with reference to FIG. 10, the towing ship discriminating module 15$b$ determines whether each of a difference between |D0($t$-4)| and |D1($t$-4)|, a difference between |D0($t$-3)| and |D1($t$-3)|, . . . , a difference between |D0($t$)| and |D1($t$)| is smaller than the predetermined length. Further, the towing ship discriminating module 15$b$ determines whether a difference between the total distance that one of the echo images moves from the timing (t-5) to the timing t and the total distance that the other echo image moves from the timing (t-5) to the timing t is smaller than a predetermined length. If even one of the differences between the distances described above exceeds the corresponding predetermined length, the two echo images E0 and E1 are determined to be not detected from the towing ship signals, and the flow ends. On the other hand, if all the differences between the distances described above are smaller than the corresponding predetermined distances, the flow proceeds to S40.

Next, the towing ship discriminating module 15$b$ detects an overlapping end point (first target point) for each of the echo images E0 and E1. The overlapping end point is a representative point of one of the echo images determined to be efficiently close to an oldest segment of the other echo image (first reference segment, D1($t$-4) in this modification). Note that, the oldest segment is a segment connecting, among representative points of an echo image detected at a plurality of timings, a representative point (oldest point) detected first with a representative point detected the next to the oldest point in terms of time. The oldest segment is generated by the track segment generating module 17.

Figure 11:
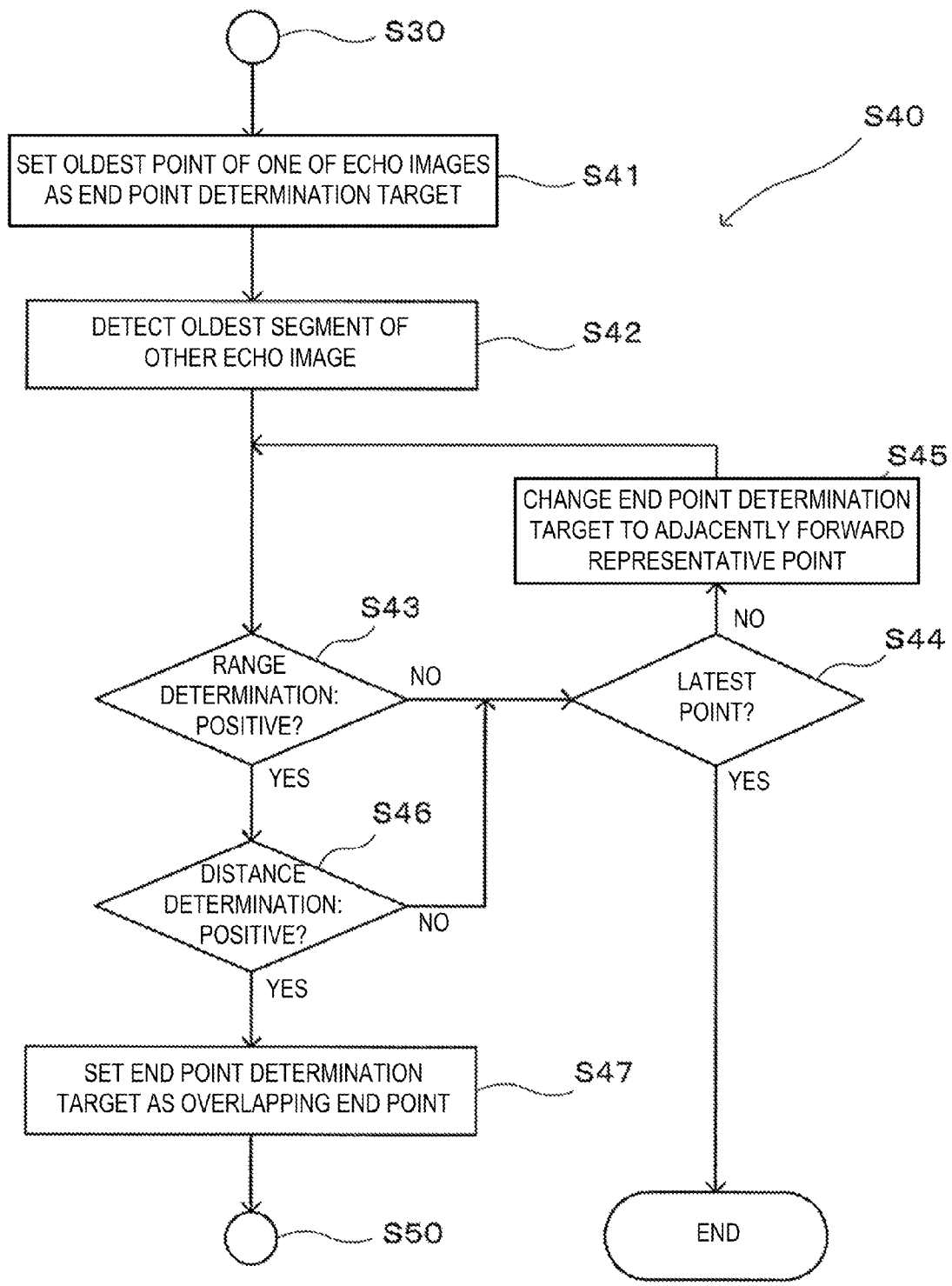
FIG. 11 is a flowchart of detection of an overlapping end point.
Figure 12:
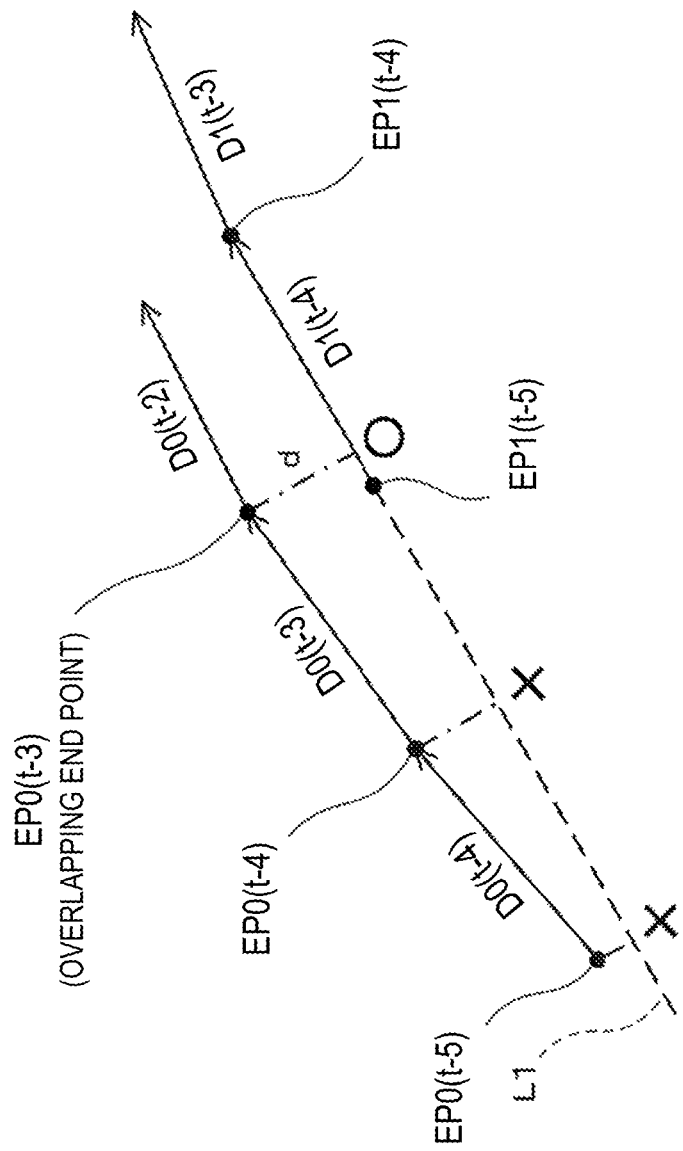
FIG. 12 is a view illustrating a part of FIG. 10 in an enlarged manner.

FIG. 11 is a flowchart of the detection of the overlapping end point. Moreover, FIG. 12 is a view for describing the flowchart of FIG. 11 and is a part of FIG. 10 illustrated in an enlarged manner. Hereinafter, a flow of detecting the overlapping end point with reference to FIGS. 11 and 12.

At S41, the towing ship discriminating module 15$b$ sets an oldest point (EP0($t$-5) in FIG. 12) of one of the echo images (here, E0) to be an end point determination target, and at S42, the towing ship discriminating module 15$b$ detects an oldest segment (D1($t$-4) in FIG. 12) of the other echo image (here, E1).

Next, at S43, the towing ship discriminating module 15$b$ performs a range determination. Specifically, the towing ship discriminating module 15$b$ determines whether a line drawn from the end determination target EP0($t$-5) perpendicularly to a straight line including the oldest segment D1($t$-4) intersects with the oldest segment D1($t$-4). In the example of FIG. 12, the perpendicular line does not intersect with the oldest segment D1($t$-4) but it intersects with an extended line L1 from the oldest segment D1($t$-4). Therefore, the result of the range determination is negative (S43: NO), and the flow proceeds to S44.

Next, at S44, the towing ship discriminating module 15$b$ determines whether the end point determination target EP0($t$-5) is a latest point. Here, the latest point is a latest representative point among the plurality of representative points. At this stage, since the end point determination target EP0($t$-5) is not the latest point (S44: NO), the flow proceeds to S45.

Next, at S45, the towing ship discriminating module 15$b$ changes the end point determination target EP0($t$-5) to the representative point of a next timing that is one unit time forward of the timing at which the currently used end point determination target (here, EP0($t$-5)) is captured (may simply be referred to as "the adjacently forward representative point"), in other words, the end point determination target EP0($t$-4). Note that, the "one unit time" used here means a period of time between two continuous timings, such as, a period of time between the timing (t-5) and the timing (t-4), a period of time between the timing (t-1) and the timing t, etc.

Next, at S43, the towing ship discriminating module 15$b$ performs the range determination described above, for the newly set end point determination target EP0($t$-4). Also here, the line drawn from the end point determination target EP0($t$-4) perpendicularly to the straight line including the oldest segment D1($t$-4) does not intersect with the oldest segment D1($t$-4) but intersects with the extended line L1 from the oldest segment D1($t$-4). Therefore, the result of the range determination is negative (S43: NO). Since the end point determination target EP0($t$-4) is not the latest point (S44: NO), the end point determination target EP0($t$-4) is changed to the adjacently forward representative point, in other words, the end point determination target EP0($t$-3) is newly set.

Next, at S43, the towing ship discriminating module 15$b$ performs the range determination described above, for the newly set end point determination target EP0($t$-3). Here, as illustrated in FIG. 12, a line drawn from the end point determination target EP0($t$-3) perpendicularly to the straight line including the oldest segment D1($t$-4) intersects with the oldest segment D1($t$-4). Therefore, the result of the range determination is positive (S43: YES), and the flow proceeds to S46.

Next, at S46, the towing ship discriminating module 15*b* performs a distance determination. Specifically, the towing ship discriminating module 15*b* determines whether a distance "d" from the end point determination target (at this stage, EP0(*t*-3)) to the oldest segment (at this stage, D1(*t*-4)) is shorter than a predetermined length. If the distance d is shorter than the predetermined length, the result of the distance determination is positive (S46: YES), and the current end point determination target EP0(*t*-3) is set as the overlapping end point (S47), and the flow proceeds to S50. If the distance d exceeds the predetermined length, the result of the distance determination is negative (S46: NO), and the flow returns to S44. Hereinafter, the description of the flow from S50 is continuously given for the case where the distance d is shorter than the predetermined length. Note that, at S44, when the end point determination target is determined to be the latest point, the two echo images E0 and E1 are determined to be not detected from the towing ship signals, and the flow ends.

Moreover, in this modification, by using the two extracted echo images as a pair, the towing ship discriminating module 15*b* repeats the flow twice for the pair. Specifically, the towing ship discriminating module 15*b* performs the flow for setting the oldest segment of one of the echo images and detecting the oldest point of the other echo image, and the flow for setting the oldest segment of the other echo image and detecting the oldest point of the echo image.

For example, as illustrated in FIG. 10, even if the tracks of both of the echo images E0 and E1 substantially match with each other, when the oldest segment of the echo image E0 is set and the oldest point of the echo image E1 is set to be the end point determination target, the overlapping end point cannot be detected. Therefore, by detecting the overlapping end point for both of the echo images (E0 and E1) as a pair as described above, in the case where the tracks of both of the echo images E0 and E1 substantially match with each other, the overlap end point can surely be detected.

Figure 13:
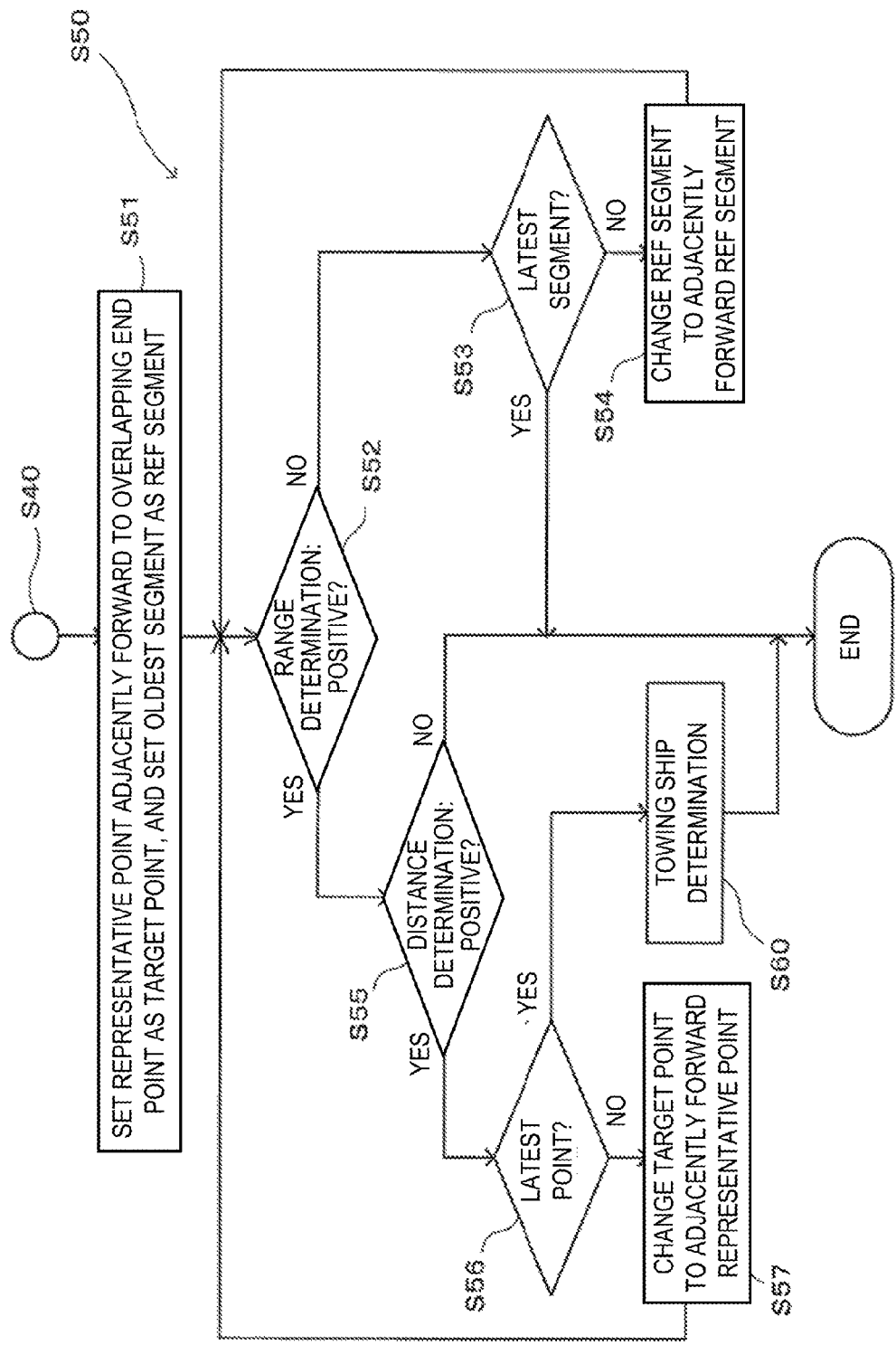
FIG. 13 is a flowchart for describing overlap determination.

Next, the towing ship discriminating module 15*b* performs an overlap determination. In the overlap determination, whether the tracks of the echo images E0 and E1 substantially match with each other over a predetermined distance. The overlap determination is described in detail based on the flowchart of the overlap determination in FIG. 13.

First, at S51, the towing ship discriminating module 15*b* sets a target point as an adjacently forward representative point to the overlapping end point obtained as described above (second target point, EP0(*t*-2) in FIG. 10). Moreover, at S51, the towing ship discriminating module 15*b* sets the oldest segment D1(*t*-4) to be a reference segment. Further, the towing ship discriminating module 15*b* determines whether the target point EP0(*t*-2) is within a predetermined range defined based on the reference segment D1(*t*-4) (range determination). Specifically, at S52, the towing ship discriminating module 15*b* determines whether a line drawn from the target point EP0(*t*-2) perpendicularly to the straight line including the reference segment D1(*t*-4) intersects with the reference segment D1(*t*-4). Since the perpendicular line intersects with the reference segment D1(*t*-4), the result of the range determination is positive (S52: YES), and the flow proceeds to S55.

Next, at S55, the towing ship discriminating module 15*b* performs a distance determination. Specifically, the towing ship discriminating module 15*b* determines whether a distance from the target point EP0(*t*-2) to the reference segment D1(*t*-4) is shorter than a predetermined length. If the distance is shorter than the predetermined length, the result of the distance determination is positive (S55: YES), and the flow proceeds to S56. On the other hand, if the distance exceeds the predetermined length, the result of the distance determination is negative (S55: NO), and the two echo images E0 and E1 are determined to be detected from the towing ship signals, and the flow ends. Here, the description of the flow from S56 is continuously given for the case where the distance is shorter than the predetermined length.

Next, at S56, the towing ship discriminating module 15*b* determines whether the target point EP0(*t*-2) is the latest point. Since the target point EP0(*t*-2) is not the latest point (S56: NO), the target point EP0(*t*-2) is changed to the adjacently forward representative point at S57, in other words, EP0(*t*-1) becomes a new target point, and the range determination at S52 is performed again.

Since a line drawn from the target point EP0(*t*-1) perpendicularly to the reference segment D1(*t*-4) does not intersect with the reference segment D1(*t*-4), the result of the range determination is negative (S52: NO), and the flow proceeds to S53.

Next, at S53, the towing ship discriminating module 15*b* determines whether the reference segment D1(*t*-4) is a latest segment. Note that, the latest segment is a segment connecting a latest point among representative points of an echo image at a plurality of timings, with a representative point adjacent to the latest point in terms of time, and in FIG. 10, D1(*t*) is the latest segment. Since the reference segment D1(*t*-4) is not the latest segment (S53: NO), at S54, the reference segment D1(*t*-4) is changed to a reference segment of a next time slot that is one unit time forward of the time slot corresponding to the currently used reference segment (here, D1(*t*-4)) (may simply be referred to as "the adjacently forward reference segment"), in other words, a reference segment D1(*t*-3) generated by the track segment generating module 17 becomes a new reference segment, and the range determination at S52 is performed again. Note that, the reference segment D1(*t*-3) is a track segment (second reference segment) adjacent to the segment D1(*t*-4) (first reference segment) on a later time slot side of the segment D1(*t*-4).

Next, at S52, the towing ship discriminating module 15*b* performs the range determination for the target point EP0 (*t*-1) again. Here, a line drawn from the target point EP0(*t*-1) perpendicularly to a straight line including the reference segment D1(*t*-3) intersects with the reference segment D1(*t*-3). Thus, the result of the range determination is positive (S52: YES), and the flow proceeds to a distance determination at S55. In the distance determination, if a distance from the target point EP0(*t*-1) to the reference segment D1(*t*-3) is shorter than the predetermined length, the result of the distance determination is positive (S55: YES), and the flow proceeds to S56.

Next, at S56, the towing ship discriminating module 15*b* determines whether the target point EP0(*t*-1) is the latest point. Since the target point EP0(*t*-1) is not the latest point (S56: NO), the target point EP0(*t*-1) is changed to the adjacently forward representative point and EP0(*t*) becomes a new target point, and the range determination at S52 is performed again.

Since a line drawn from the target point EP0(*t*) perpendicularly to the reference segment D1(*t*-3) does not intersect with the reference segment D1(*t*-3), the result of the range determination is negative (S52: NO), and the flow proceeds to S53. At S53, the towing ship discriminating module 15*b* determines that the reference segment D1(*t*-3) is not the latest segment (S53: NO), then the reference segment D1(*t*-3) is changed to the adjacently forward representative point, in other words, a segment D1(t-2) generated by the track segment generating module 17 becomes a new reference segment, and the range determination at S52 is performed again.

Next, at 52, the towing ship discriminating module 15b performs the range determination again, for the target point EP0(t). Here, a line drawn from the target point EP0(t) perpendicularly to a straight line including the reference segment D1(t-2) intersects with the reference segment D1(t-2). Thus, the result of the range determination is positive (S52: YES), and the flow proceeds to S55.

Next at S55, the towing ship discriminating module 15b performs the distance determination. Specifically, the towing ship discriminating module 15b determines whether a distance from the target point EP0(t) to the reference segment D1(t-2) is shorter than the predetermined length. If the distance is shorter than the predetermined length, the result of the distance determination is positive (S55: YES), and the flow proceeds to S56.

Then, at S56, the towing ship discriminating module 15b determines whether the target point EP0(t) is the latest point. Since the target point EP0(t) is the latest point (S56: YES), the towing ship discriminating module 15b determines that the two echo images E0 and E1 are detected from the towing ship signals (S60), and the flow ends.

By the above flow, regarding two of the plurality of echo images, the towing ship discriminating module 15b determines whether the two echo images are detected from the towing ship signals. Then, similar to the above embodiment, the towing ship discriminating module 15b sequentially performs the two point extraction for the rest of all the possible combinations in the predetermined area, and sequentially determines, for these combinations, whether the two extracted points are detected from the towing ship signals.

Effects

As above, also with the signal processing device 3b of this modification, similar to the above embodiment, the coordinates of the representative point are obtained at two or more timings for each of the two echo images, and whether the two echo images are detected from the towing ship signals is determined based on the obtained coordinates. Then, in this modification, whether the two echo images are detected from the towing ship signals is determined based on the segment connecting the representative points of one of the echo images at the respective timings and the representative points of the other echo image at the respective timings, in other words, the tracks of the two echo images. Thus, whether the two echo images are detected from the towing ship signals is determined from a different point of view from the above embodiment.

Moreover, with the signal processing device 3b, the two echo images are determined to be detected from the towing ship signals under the condition that the distance between the representative point of the echo image E0 at a certain timing and the track segment of the other echo image E1 in a certain time slot is shorter than the predetermined length and the condition that the distance between the adjacently forward representative point of the above representative point of the certain timing and either one of the above track segment and the adjacently forward reference segment of the above track segment is shorter than the predetermined length. When the two echo images are in the relation between the towing ship and the towed ship, the tracks thereof substantially match. Therefore, by setting the above conditions (at least two of the continuous representative points of one of the echo images in terms of time is close to the segment approximated to the track (track segment) of the other echo image), the echo images E0 and E1 of which tracks substantially match can be suitably included in the candidates of the towing ship signals.

Moreover, with the signal processing device 3b, the two echo images are determined to be detected from the towing ship signals under the condition that the difference in length between the segment connecting two representative points of one of the two echo images at two continuous timings and the segment connecting two representative points of the other echo image at the same two continuous timings is smaller than the predetermined length. When the two echo images are in the relation between the towing ship and the towed ship, the distances that both of the echo images move in the same time slot are substantially the same. Therefore, by setting the above condition, the echo images E0 and E1 that move substantially the same distance in the same time slot can be suitably included in the candidates of the towing ship signals.

Moreover, with the signal processing device 3b, the two echo images are determined to be detected from the towing ship signals under the condition that the difference between the total length of the track segments of one of the echo images and the total length of the track segments of the other echo image is smaller than the predetermined length. Thus, the two echo images in which a slight difference caused between a track segment of one of the echo images and a track segment of the other echo image in a corresponding time slot accumulates and the accumulated difference becomes large, can be excluded from the determination target of the towing ship signals.

In the above embodiment and modifications, the radar apparatuses 10, 10a and 10b discriminate the towing ship and the towed ship on the sea from other ships; however, the discrimination targets are not limited to the towing and towed ships, and they may be any other objects that are in the relation of towing and being towed.

This disclosure can be applied broadly as a signal processing device, which processes a reception signal received by an object detector, and as a radar apparatus, which includes the signal processing device.

In the foregoing specification, specific embodiments of this disclosure have been described. However, one of ordinary skill in the art appreciates that various modifications and changes can be made without departing from the scope of this disclosure as set forth in the claims below. Accordingly, the specification and figures are to be regarded in an illustrative rather than a restrictive sense, and all such modifications are intended to be included within the scope of this disclosure. The benefits, advantages, solutions to problems, and any element(s) that may cause any benefit, advantage, or solution to occur or become more pronounced are not to be construed as a critical, required, or essential features or elements of any or all the claims. This disclosure is defined solely by the appended claims including any amendments made during the pendency of this application and all equivalents of those claims as issued.

What is claimed is:

1. A radar apparatus, comprising:
    an antenna configured to receive radio waves;
    a reception device configured to receive the radio waves from the antenna and convert them into digital signals;
    a signal processing device configured to process reception signals received by an object detector that detects existence of objects, by:
        detecting a plurality of sets of representative coordinates of each of two echo images at two or more timings, the two echo images obtained from the reception signals and caused by two target objects;

determining, based on the plurality of sets of representative coordinates at the two or more timings, whether the two echo images are obtained from towing object signals caused by a pair of a towing object and a towed object; and calculating a moving distance and a moving direction of each of the echo images per predetermined period of time, based on the plurality of sets of representative coordinates at the two or more timings; and a display unit configured to display the echo images determined to be obtained from the towing object signals by the signal processing device in a manner that the echo images are recognizable as being obtained from the towing object signals caused by the pair of the towing object and the towed object, wherein the signal processing device determines that the two echo images are obtained from the towing object signals when a first condition and at least one of second and third conditions are satisfied, wherein the first condition is that a difference between the moving distance of one of the two echo images and the moving distance of the other echo image is smaller than a predetermined length, wherein the second condition is that an angle between an echo image segment connecting the two echo images and the moving direction of one of the two echo images is smaller than a predetermined angle and an angle between the moving directions of the two echo images is smaller than a predetermined angle, at one of the two or more timings, and wherein the third condition is that each of an angle between the moving direction of one of the two echo images and the echo image segment is smaller than a predetermined angle and an angle between the moving direction of the other echo image and the echo image segment is smaller than a predetermined angle, at the one of the two or more timings.

2. The radar apparatus of claim 1, wherein the signal processing device determines that the two echo images are obtained from the towing object signals under a condition that the echo image segment is shorter than a predetermined length, in addition to the first condition and at least one of the second and third conditions.

3. The radar apparatus of claim 1, wherein the signal processing device determines that the two echo images are obtained from the towing object signals under a condition that both of the moving distances of the two echo images per predetermined period of time are within predetermined ranges, respectively, in addition to the first condition and at least one of the second and third conditions.

4. A radar apparatus, comprising:
an antenna configured to receive radio waves;
a reception device configured to receive the radio waves from the antenna and convert them into digital signals;
a signal processing device configured to process reception signals received by an object detector that detects existence of objects, by:
  detecting a plurality of sets of representative coordinates of each of two echo images at two or more timings, the two echo images obtained from the reception signals and caused by two target objects;
  determining, based on the plurality of sets of representative coordinates at the two or more timings, whether the two echo images are obtained from towing object signals caused by a pair of a towing object and a towed object; and
  calculating a moving distance and a moving direction of each of the echo images per predetermined period of time, based on the plurality of sets of representative coordinates of the respective echo images at the two or more timings; and
a display unit configured to display the echo images determined to be obtained from the towing object signals by the signal processing device in a manner that the echo images are recognizable as being obtained from the towing object signals caused by the pair of the towing object and the towed object, wherein the signal processing device determines that the two echo images are obtained from the towing object signals under a fourth condition that a length of a first echo image segment connecting the sets of representative coordinates of the two echo images corresponding to a first timing of the two or more timings is different, by less than a predetermined length, from a length of a second echo image segment connecting the sets of representative coordinates of the two echo images corresponding to a second timing of the two or more timings, and that an angle between the moving direction of one of the two echo images from the first timing to the second timing and one of the first and second echo image segments is smaller than a predetermined angle and an angle between the first and second echo image segments is smaller than a predetermined angle.

5. The radar apparatus of claim 4, wherein the signal processing device determines that the two echo images are obtained from the towing object signals under a condition that both of the first and second echo image segments are shorter than predetermined lengths, respectively, in addition to the fourth condition.

6. The radar apparatus of claim 4, wherein the signal processing device determines that the two echo images are obtained from the towing object signals under a condition that at least one of the moving distances of the two echo images is within a predetermined range, in addition to the fourth condition.

7. A radar apparatus, comprising:
an antenna configured to receive radio waves;
a reception device configured to receive the radio waves from the antenna and convert them into digital signals;
a signal processing device configured to process reception signals received by an object detector that detects existence of objects, by:
  detecting a plurality of sets of representative coordinates of each of two echo images at two or more timings, the two echo images obtained from the reception signals and caused by two target objects;
  determining, based on the plurality of sets of representative coordinates at the two or more timings, whether the two echo images are obtained from towing object signals caused by a pair of a towing object and a towed object;
  calculating a plurality of sets coordinates of representative points of each of the two echo images at three or more timings; and
  generating, for one of the two echo images, a plurality of track segments by using the representative points of the corresponding echo image at the three or more timings, each track segment formed by connecting the representative points calculated at two continuous timings of the three or more timings; and a display unit configured to display the echo images determined to be obtained from the towing object signals by the signal processing device in a manner that the echo images are recognizable as being obtained from the towing object signals caused by the pair of the towing object and the towed object, wherein the signal processing device determines that the two echo images are obtained from the towing object signals under a condition that a distance between a first target point and a first reference segment is shorter than a predetermined length and a distance between a second target point and a second reference segment is shorter than the predetermined length, the first target point being one of the representative points of the other echo image at the three or more timings, the first reference segment being one of the plurality of track segments, the second target point being the representative point calculated the next to the first target point in terms of time, the second reference segment being the track segment generated the next to the first reference segment in terms of time.

8. The radar apparatus of claim 7, wherein the signal processing device determines that the two echo images are obtained from the towing object signals under a condition that each distance between two of the representative points of one of the echo images at two continuous timings of the three or more timings is different, by less than a predetermined length, from the distance between the representative points of the other echo image at the same two continuous timings, and that a total distance that one of the echo images moves between the three or more timings is different, by less than a predetermined length, from a total distance that the other echo image moves between the three or more timings, in addition to the condition that each of the distance between the first target point and the first reference segment and the distance between the second target point and the second reference segment is shorter than the predetermined length.

* * * * *